US010635662B2

(12) United States Patent
Agrawal et al.

(10) Patent No.: US 10,635,662 B2
(45) Date of Patent: Apr. 28, 2020

(54) SIGNATURE DETECTION

(71) Applicant: INTERNATIONAL BUSINESS MACHINES CORPORATION, Armonk, NY (US)

(72) Inventors: Dakshi Agrawal, Yorktown Heights, NY (US); Rashed Z. Bhatti, Yorktown Heights, NY (US); Francis N. Parr, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1022 days.

(21) Appl. No.: 15/153,504

(22) Filed: May 12, 2016

(65) Prior Publication Data

US 2017/0329821 A1 Nov. 16, 2017

(51) Int. Cl.
*G06F 16/245* (2019.01)
*G06F 16/22* (2019.01)

(52) U.S. Cl.
CPC ........ *G06F 16/245* (2019.01); *G06F 16/2282* (2019.01)

(58) Field of Classification Search
None
See application file for complete search history.

(56) References Cited

U.S. PATENT DOCUMENTS 8,180,916 B1 5/2012 Nucci et al.
8,665,911 B2 * 3/2014 Law .................... H04L 63/0263
370/488
2003/0084326 A1 * 5/2003 Tarquini ............. H04L 63/1408
726/23
2007/0226352 A1 9/2007 Nishio
2007/0250473 A1 * 10/2007 Larson ............. G06F 16/24539
2008/0313128 A1 * 12/2008 Arasu ..................... G06F 16/22
(Continued)

OTHER PUBLICATIONS

Zdravko Galic, et al., "OCEANUS: A Spatio-Temporal Data Stream System Prototype," Proceedings of the Third ACM SIGSPATIAL International Workshop on GeoStreaming, 2012, pp. 109-115. doi: 10.1145/2442968.2442982. S.
(Continued)

*Primary Examiner* — Neveen Abel Jalil
*Assistant Examiner* — Katriel Y Chiu
(74) *Attorney, Agent, or Firm* — F. Chau & Associates, LLC

(57) ABSTRACT

A method for multicategory classification of streaming data records includes receiving a list of signature rules, each comprising a Boolean expression of a set of atomic recognizers (ARs) of one or more input fields of an input record and an assignment of a signature if the Boolean expression evaluates to TRUE, generating a list of all signature contexts from the list of signature rules, generating a context lookup table for each context, and processing a stream of input records on which signature detection is performed by using said ARs, said list of signature contexts, and said context lookup table for each context, wherein each input record in the stream of input records is classified into one of a plurality of categories based on the signature detection result, wherein an amount of processing grows sublinearly with a number of signature rules being processed.

26 Claims, 12 Drawing Sheets

(56) References Cited

U.S. PATENT DOCUMENTS

| | | | |
|---|---|---|---|
| 2010/0153316 A1 | 6/2010 | Duffield et al. | |
| 2011/0283362 A1* | 11/2011 | Horneff | H04H 20/38 726/26 |
| 2014/0019486 A1* | 1/2014 | Majumdar | G06F 16/2228 707/780 |
| 2014/0156901 A1 | 6/2014 | Raichelgauz et al. | |
| 2015/0213358 A1 | 7/2015 | Shelton et al. | |
| 2015/0310115 A1* | 10/2015 | Ryger | G06F 16/93 707/708 |

OTHER PUBLICATIONS

Subhabrata Sen, et al., "Accurate, Scalable In-Network Identification of P2P Traffic Using Application Signatures," Proceedings of the 13th International Conference on World Wide Web, 2004, 512-521. doi: 10.1145/988672.988742.

Kresimir Krizavonic, et al., "Spatio-Temporal Data Streams: An Approach To Managing Moving Objects," Proceedings of the 33rd International Convention MIPRO, 2010, 744-749.

\* cited by examiner

201

Field dst_ip_addr        string
Field dst_port           integer
Field src_ip_addr        string
Field src_port           integer
Field raw_data           string
Field raw_data_length    integer
Field packet_index       integer

202

Rule 1: if      ( raw_data    RE match    "^[\x80|\x90].*5" )
        AND ( dst_ip_addr    in range   38.117.38.1 / 26 )
        then    signature = "vbuzzer"

Rule 2: if      ( raw_data    RE match    "\x64.\x3a.\x64..\x3a\x69\x64.*5" )
        then    signature = "bittorrent"

Rule 3: if      ( raw_data    RE match    "\x3a]\x00-\x7f]\x02\x01.*5" )
        AND ( dst_port     in set      [161,162] )
        then    signature = "snmp"

Rule 4: if      ( raw_data    RE match    "^[\x80]\x28][\x28]\xc3].*5" )
        then    signature = "rtcp"

Rule 5: if      ( raw_data    RE match    "^[\x00|\x01] [\x01|\x02|\x11|\x12].{18} \x00 .*5" )
        AND ( dst_ip_addr    in range   74.125.0/255.3/254 )
        AND ( dst_port     in set      [19305,19306,19307,19308, 19309] )
        then    signature = "googletalk_calls"

Rule 6: if      ( raw_data    RE match    "^\xd1\x8a][\x2e\x2e]\xa5\x00\x10.{4}\x02\x18.*5" )
        then    signature = "weixin_wechat"

Rule 7: if      ( dst_ip_addr    in range   216.239.32/63.3/254 )
        AND ( dst_port     == 9785 )
        then    signature = "googletalk"

Rule 8: if      (raw_data     RE match    "^[\x64\x05]{\x3e\x3f]\x1a]\x28.\x36{\x43.*5" )
        AND ( data length    in range   16 ~ 100 )
        then    signature = "tango"

FIG. 2

701 s1: ( X → x1 ) AND ( Y → y1 )
s2: ( X → x2 )
s3: ( X → x3 ) AND ( Z → z3 )
s4: ( X → x4 )
s5: ( X → x5 ) AND ( Y → y5 ) AND ( Z → z5 )
s6: ( X → x6 )
s7: ( Z → z7 )
s8: ( Y → y8 ) AND ( Z → z8 )
s9: ( Y → y9 )

702

*Context X*
x2: result s2
x4: result s4
x6: result s6

*Context X Y*
<x1, y1> : result s1

*Context X Z*
<x3, z3> : result s3

*Context X Y Z*
<x5, y5, z5> : result s5

*Context Z*
z7: result s7

*Context Y Z*
<y8, z8> : result s8

*Context Y*
y9: result s9 else NO_SIGNATURE_MATCH — end

703

X (0); XY (2); XZ (4); XYZ (6); Z (7); YZ (8); Y (9)

704

Context X
X values     (0, x1, x2, x3, x4, x5, x6)
X runtime:    0  0  s2  0  s4  0  s6

705

Context Y Z
Y values     (0, y1, y5, y8, y9)
Z values     (0, z3, z5, z8)

Y Z runtime:  0  0  0  0
              0  0  0  0
              0  0  0  0
              0  0  0  s8

FIG. 7

801
Input record structure specification

| Field | dst_ip_addr | string |
| Field | dst_port | integer |
| Field | src_ip_addr | string |
| Field | src_port | integer |
| Field | raw_data | string |
| Field | raw_data_length | integer |
| Field | packet_index | integer |

803
State key string specification

State-key: <dst_ip_addr, src_ip_addr>

802
Signature rule list

Rule 1: if      ( raw_data    RE_match   "/[\x80[\x90].*$" )
        AND  ( dst_ip_addr   in range   38.117.98.1 / 126 )
        then    signature = "vbuzzer"

Rule 2: if      ( raw_data    RE_match   "\x64.\x3a.\x64..\x3a\x65]\x64.*$" )
        then    signature = "bittorrent"

Rule 3: if      ( raw_data    RE_match   "\x30[\x00-\x7f]\x02\x01.*$" )
        AND  ( dst_port    in set    [161,162 ] )
        then    signature = "snmp"

Rule 4: if      ( raw_data    RE_match   "/[\x80[\x90][\xc5[\xc9].*$" )
        then    signature = "rtcp"

Rule 5: if      ( raw_data    RE_match    in range   74.125.0/255.1/254 )
        AND  ( dst_ip_addr   in set    [19305,19306,19307,19308, 19309] )
        then    signature = "googletalk_calls"

Rule 6: if      ( raw_data    RE_match   "\x43[\x3a[\x2e]\x2a]\x2a]\x2e]\x6a]\x60[\x1a].(4)\x02[\x18.*$" )
        then    signature = "weixin_wechat"

Rule 7: if      ( dst_ip_addr   in range   216.239.32/63.1/254 )
        AND  ( dst_port    = 9785 )
        then    signature = "googletalk"

Rule 8: if      ( raw_data    RE_match   "/[\x04[\x05][\x3e[\x3f]\x1a]\x29-\x36]\x43.*$" )
        AND  ( data_length   in range   16 – 100 )
        then    signature = "rango"

804
Stateful signature rules

Rule 9:  if      ( raw_data    RE_match   "^..\x02.*$" )
         AND  ( packet_index = 1 )
         AND  ( FROM_STATE = INIT )
         then    TO_STATE = "skype_state_1"

Rule 10: if      ( raw_data    RE_match   "^..\x02.*$" )
         AND  ( packet_index = 1 )
         AND  ( FROM_STATE = "skype_state_1" )
         then    TO_STATE = FINAL
                 signature = "skype_state_sequence"

FIG. 8A

SIGNATURE DETECTION

BACKGROUND

1. Technical Field

Embodiments of the present disclosure are directed to methods for multicategory classification of streaming data records using signature detection rules containing arbitrary Boolean combinations of predicates on the data fields of each record, the required amount of processing being sub-linear in the number of signature rules being checked.

2. Discussion of the Related Art

"Big Data" is an all-encompassing term for any collection of data sets so large and complex that it becomes difficult to process using traditional data processing applications. The challenges include analysis, capture, curation, search, sharing, storage, transfer, visualization, and privacy violations. The trend to larger data sets is due to the additional information derivable from analysis of a single large set of related data, as compared to separate smaller sets each structured to address a specific processing need, allows broad correlations to be found to spot business trends, prevent diseases, combat crime, and so on. Processing of large data sets is important for fields such as fraud detection, custom profile analytics, deoxyribonucleic acid (DNA) analysis, etc.

Information management (IM) is the collection and management of information from one or more sources and the distribution of that information to one or more audiences. This sometimes involves those who have a stake in, or a right to, that information. Management means the organization of and control over the planning, structure, processing, evaluating, and reporting of information activities in order to meet client objectives and to enable enterprise functions in the delivery of information.

In the Big Data world, arriving data records should be processed at high speed to identify which of the records include a source string that matches one of a set of pre-defined signatures. Each signature can be expressed using regular expressions (RE), sets of keywords or other recognizable patterns or generic sequences applied to fields in input records. The result of processing for each arriving input string is to report which, if at least one, of the target signatures is matched. The set of signatures to be matched may be large, perhaps in the hundreds or more, and the set may be frequently changed or refined to better fit the target data of interest as the users' interests and understanding of the arriving data changes. It is advantageous for updating of the target signature set to be non-disruptive.

Data analysts need to perform streaming analytics to obtain insight from arriving data records in near real-time i.e. as "soon as possible" after new data records arrive and are available for analysis. The arriving data rates may be high 100,000 records/sec. A useful form of analysis is to detect data signatures in the arriving records and use these to classify each record into one of a potentially large set of categories, a process referred to as fine-grained multicategory classification.

Signature detection rules for classifying can be conveniently specified as a Boolean combination involving AND, OR, NOT operations applied to underlying atomic predicate tests on individual data fields of the record being classified. The underlying atomic predicate operations may include:

Testing whether an input record field matches a specified regular expression (RE);

Testing whether an input record string starts with or ends with a specified character string or regular expression;

Testing whether the field contains one or more of a set of (equivalent) key words;

Testing whether the field is equal to one of a set of (equivalent) matching strings;

Testing whether a (typed) field value lies within some specific range of values, such as (1) including ranges and specific values of integers, (2) ranges and specific values of IP addresses, and (3) ranges and specific values of real (floating point) numbers; and Testing, using a threading field in the input data record, whether the most recent state value seen for that thread is either not initialized or has some state value set by a previous signature detection in the stream.

The number of signature rules to be checked for each arriving data record in the stream may be large. It is often convenient for the signature rule set to be presented in priority order with the most informative, narrower classification categories presented earlier in the sequence and less informative, more general classification categories being presented later in the sequence. This organization enables an early "quit" in signature match processing if a signature match has been found and it can be shown that there will be no match of higher priority discovered by further signature match processing, since further testing will be for lower priority signatures.

The signature rule set changes frequently, e.g., daily, weekly or monthly, to reflect changing analytics needs in the business domain for which classification is being performed, and the characteristics of the application domain itself may be changing. An analyst's perception of the most useful classification categories to be identified using signature detection may also be changing.

It is useful for a signature detection system to be able to incorporate a newly changed signature rule set quickly and non-disruptively into its active processing, in particular, without recompiling the code. It is also convenient to organize a signature detection capability as an operator which can then be incorporated into a user's specific streaming analytics solution. In this way signature detection processing to classify data records can be combined with other analytics techniques on the streaming data specific to each users solution.

SUMMARY

Exemplary embodiments of the disclosure provide systems and methods for signature detection processing for multicategory classification of streaming data records.

According to an embodiment of the disclosure, there is provided a method for multicategory classification of streaming data records, including receiving a list of signature rules, wherein a signature rule comprises a Boolean expression of a set of atomic recognizers (ARs) of one or more input fields of an input record and an assignment of a signature if the Boolean expression evaluates to TRUE, and an atomic recognizer is a logic function which takes an input record field value as input and determines which of different rule values for a <field, predicate-type> tuple corresponds to this input record field, generating a list of distinct signatures from the list of signature rules, generating a list of ARs from the list of signatures, and for each AR, a table of possible results for that AR, generating a list of all signature contexts from the list of signature rules, wherein the context of a signature rule is a subsequence of ARs ANDed together as conditions in the signature rule, generating a context lookup table for each context, wherein a dimensionality of each context table equals the number of AR's, a number of elements in each dimension is a number of possible output values of the corresponding AR, and for each context and for each rule resolved by that context, a context lookup table value corresponding to an AR output value is set to the signature result of that AR output value, determining a quit level for each context, and processing a stream of input records on which signature detection is performed by using said list of ARs, said list of signature contexts, and said context lookup table for each context, wherein each input record in the stream of input records is classified into one of a plurality of categories based on the signature detection result, wherein an amount of processing grows sublinearly with a number of signature rules being processed.

According to a further embodiment of the disclosure, the method comprises outputting a stream of output records that include the classification of each input record based on the signature detection result.

According to a further embodiment of the disclosure, each signature rule is in conjuctive normal form.

According to a further embodiment of the disclosure, the list of ARs is generated from the list of signature rules by listing, for each input record field, a list of different AR predicates that take values of said input record fields as input, wherein AR predicates include a regular expression match, a string match of a starting substring or an ending substring of an input record field with a specified character string or regular expression, a test of whether a string input record field value includes a keyword, a match of the input record field value to one of a set of matching strings, a test of whether an input record field value lies within a specific range of values, and a test of whether a most recent value of a state associated with input records having a particular key field value is either not initialized or has a value set by a previous signature operation.

According to a further embodiment of the disclosure, the method includes generating deterministic finite state automata (DFAs) from specifications of string AR's dealing with regular expression matching, keyword search, and beginning and ending substrings, wherein said DFAs are also used to detect signatures in the stream of input records, generating memory representations of those AR's that deal with value sets and value ranges for integer, floating point and address fields, and converting those AR's which do not require regular expression or keyword compilation into memory tables.

According to a further embodiment of the disclosure, determining a quit level for each context comprises determining, for each context in order, a number wherein all higher precedence signature rules in a signature precedence order have already been resolved in this or a higher precedence context.

According to a further embodiment of the disclosure, processing a stream of input records on which signature detection is to be performed includes reading an input record from an input data stream, initializing state variables that track progress of signature detection processing in the input record, wherein that state variables include an AR result vector and a BEST_MATCH_SO_FAR variable, wherein the AR result vector has one entry for each AR defined for a current set of signature rules for storing a result of running that AR on an appropriate field of a current input record, and BEST_MATCH_SO_FAR is updated as signature matches are detected during processing of an input record to reflect that a signature match with a rule of higher precedence has been found, applying the ARs for each signature context of the list of signature rules to the input record and saving an AR result value to the AR result vector, and determining from the context lookup table whether the AR result values in the AR result vector correspond to a signature match.

According to a further embodiment of the disclosure, the method includes comparing, if a signature match has been found, a precedence of the signature match for this context with a precedence of a previous BEST_MATCH_SO_FAR, and updating BEST_MATCH_SO_FAR precedence of the signature match for this context has a higher precedence than the previous BEST_MATCH_SO_FAR, and comparing the precedence of BEST_MATCH_SO_FAR with a precedence of the quit level, wherein if the precedence of BEST_MATCH_SO_FAR is higher than the precedence of the quit level, processing of the input record ceases.

According to a further embodiment of the disclosure, each field in the input record is identified by name and type.

According to a further embodiment of the disclosure, the list of signature rules include one or more stateful signature rules that comprise a Boolean expression of a set of ARs of one or more input fields of the input record and a specification of a state transition, if the Boolean expression evaluates to TRUE, wherein the method further comprises, searching for a state-key value for the input record in a state store table using a state-key specification, wherein a state for the input record is set to the found state-key value if a state-key value is found, and the state for the input record is set to INIT if no state-key value is found, saving a destination state value for a signature rule, if no signature has been matched for the input record, and deleting the destination state value for the signature rule, if a signature match has been found.

According to a another embodiment of the disclosure, there is provided a method for multicategory classification of streaming data records, including receiving a list of signature rules, wherein a signature rule comprises a Boolean expression of a set of atomic recognizers (ARs) of one or more input fields of an input record and an assignment of a signature if the Boolean expression evaluates to TRUE, and an atomic recognizer is a logic function which takes an input record field value as input and determines which of different rule values for a <field, predicate-type> tuple corresponds to this input record field, reading an input record from an input data stream and identifying each field in the input record by name and type, receiving a list of all signature contexts for the list of signature rules and a context lookup table for each context, wherein the context of a signature rule is a subsequence of ARs ANDed together as conditions in the signature rule, and a context lookup table value for an AR for each context and for each rule resolved by that context is a signature result of that AR output value, initializing state variables that track progress of signature detection processing in the input record, wherein that state variables include an AR result vector and a BEST_MATCH_SO_FAR variable, wherein the AR result vector has one entry for each AR defined for a current set of signature rules for storing a result of running that AR on an appropriate field of a current input record, and BEST_MATCH_SO_FAR is updated as signature matches are detected during processing of an input record to reflect that a signature match with a rule of higher precedence has been found, applying the ARs for each signature context of the list of signature rules to the input record and saving an AR result value to the AR result vector, and determining from the context lookup table whether the AR result values in the AR result vector correspond to a signature match, wherein the input record is classified into one of a plurality of categories based on the signature detection result, wherein an amount of processing is sublinear in a number of signature rules being processed.

According to a further embodiment of the disclosure, the method includes comparing, if a signature match has been found, a precedence of the signature match for this context with a precedence of a previous BEST_MATCH_SO_FAR, and updating BEST_MATCH_SO_FAR precedence of the signature match for this context has a higher precedence than the previous BEST_MATCH_SO_FAR, and comparing the precedence of BEST_MATCH_SO_FAR with a precedence of the quit level, wherein if the precedence of BEST_MATCH_SO_FAR is higher than the precedence of the quit level, processing of the input record ceases.

According to a further embodiment of the disclosure, the method includes outputting a stream of output records that include the classification of each input record based on the signature detection result.

According to a further embodiment of the disclosure, each signature rule is in conjuctive normal form.

According to a further embodiment of the disclosure, the method includes generating a list of distinct signatures from the list of signature rules, generating a list of ARs from the list of signatures, and for each AR, a table of possible results for that AR, generating the list of all signature contexts from the list of signature rules, wherein the context of a signature rule is a subsequence of ARs ANDed together as conditions in the signature rule, generating the context lookup table for each context, wherein a dimensionality of each context table equals the number of AR's, a number of elements in each dimension is a number of possible output values of the corresponding AR, and determining a quit level for each context.

According to a further embodiment of the disclosure, the list of ARs is generated from the list of signature rules by listing, for each input record, a list of different AR predicates, wherein AR predicates include a regular expression match, a string match of a starting substring or an ending substring of an input record with a specified character string or regular expression, a test of whether an input record field value matches a keyword, a match of the input record to one of a set of matching strings, a test of whether an input record field value lies within a specific range of values, and a test of whether a most recent value of an input record field is either not initialized or has a value set by a previous signature operation.

According to a further embodiment of the disclosure, the method includes generating deterministic finite state automata (DFAs) from specifications of string AR's dealing with regular expression matching, keyword search, and beginning and ending substrings, wherein said DFAs are also used to detect signatures in the stream of input records, generating memory representations of those AR's that deal with value sets and value ranges for integer, floating point and address fields, and converting those AR's which do not require regular expression or keyword compilation into memory tables.

According to a further embodiment of the disclosure, determining a quit level for each context comprises determining, for each context in order, a number of preceding signature rules in a precedence order that have already been resolved in this or a higher precedence context.

According to a further embodiment of the disclosure, each field in the input record is identified by name and type.

According to a further embodiment of the disclosure, the list of signature rules include one or more stateful signature rules that comprise a Boolean expression of a set of ARs of one or more input fields of the input record and a specification of a state transition, if the Boolean expression evaluates to TRUE, wherein the method further comprises, searching for a state-key value for the input record in a state store table using a state-key specification, wherein a state for the input record is set to the found state-key value if a state-key value is found, and the state for the input record is set to INIT if no state-key value is found, saving a destination state value for a signature rule, if no signature has been matched for the input record, and deleting the destination state value for the signature rule, if a signature match has been found.

According to a another embodiment of the disclosure, there is provided a program storage device readable by a computer, tangibly embodying a program of instructions executed by the computer to implement a system for multicategory classification of streaming data records, said system including a signature detection compiler that converts a list of signature rules into a set of atomic recognizers (ARs), a set of contexts and a context look-up table, wherein a signature rule comprises a Boolean expression of a set of atomic recognizers of one or more input fields of an input record and an assignment of a signature if the Boolean expression evaluates to TRUE, an atomic recognizer (AR) is a logic function which takes an input record field value as input and determines which of different rule values for a <field, predicate-type> tuple corresponds to this input record field, a context of a signature rule is a subsequence of ARs ANDed together as conditions in the signature rule, and a context lookup table determines for each set of possible AR values for the AR's appearing in that context whether the given input record matches any rule with that context, a sublinear signature detection runtime processor that processes a stream of input records on which signature detection is to be performed using the set of ARs, the set of contexts and the context look-up table and outputs an annotated or updated stream of output records that include signature classification information, wherein processing for each input record is an iteration through contexts with one or more table lookup operations for each context.

According to a further embodiment of the disclosure, the system includes a string pattern converter that converts AR specifications for string oriented ARs involving Regular Expression pattern matching, key word searches and associated character by character string predicates into deterministic finite state automata (DFA) tables which can be used at run-time by the sublinear signature detection runtime processor.

According to a further embodiment of the disclosure, the set of atomic recognizers (ARs), the set of contexts, the context look-up table and the DFA tables are regenerated when the list of signature detection rules is dynamically refreshed.

According to a further embodiment of the disclosure, the system includes a graphical user interface for constructing the list of signature rules and passing said list of signature rules to the signature detection compiler.

According to a further embodiment of the disclosure, the context look-up table entries include a NOT_FOUND value for combinations of AR values which do not appear in any rule of the list of signature rules.

According to a further embodiment of the disclosure, the list of signature rules include one or more stateful signature rules that comprise a Boolean expression of a set of ARs of one or more input fields of the input record and a specification of a state transition, if the Boolean expression evaluates to TRUE, wherein the processing of the input records includes searching for a state-key value for the input record in a state store table using a state-key specification, wherein a state for the input record is set to the found state-key value if a state-key value is found, and the state for the input record is set to INIT if no state-key value is found, saving a destination state value for a signature rule, if a non final state transition signature has been matched for the input record, and deleting the destination state value for the signature rule, if a final state transition signature match has been found which results in a signature detection and an end of a state tracking sequence.

BRIEF DESCRIPTION OF THE DRAWINGS

FIG. 2 illustrates the structure and example format for a Boolean combinatorial signature rule set definition, according to an embodiment of the disclosure.

FIG. 7 illustrates examples of sublinear signature detection tables and generated structures, according to an embodiment of the disclosure.

FIGS. 8A-8B illustrate an example ruleset and associated processing flow diagram according to an embodiment in which stateful rules for detecting signatures are being processed, according to an embodiment of the disclosure.

DETAILED DESCRIPTION OF EXEMPLARY EMBODIMENTS

Figure 1:
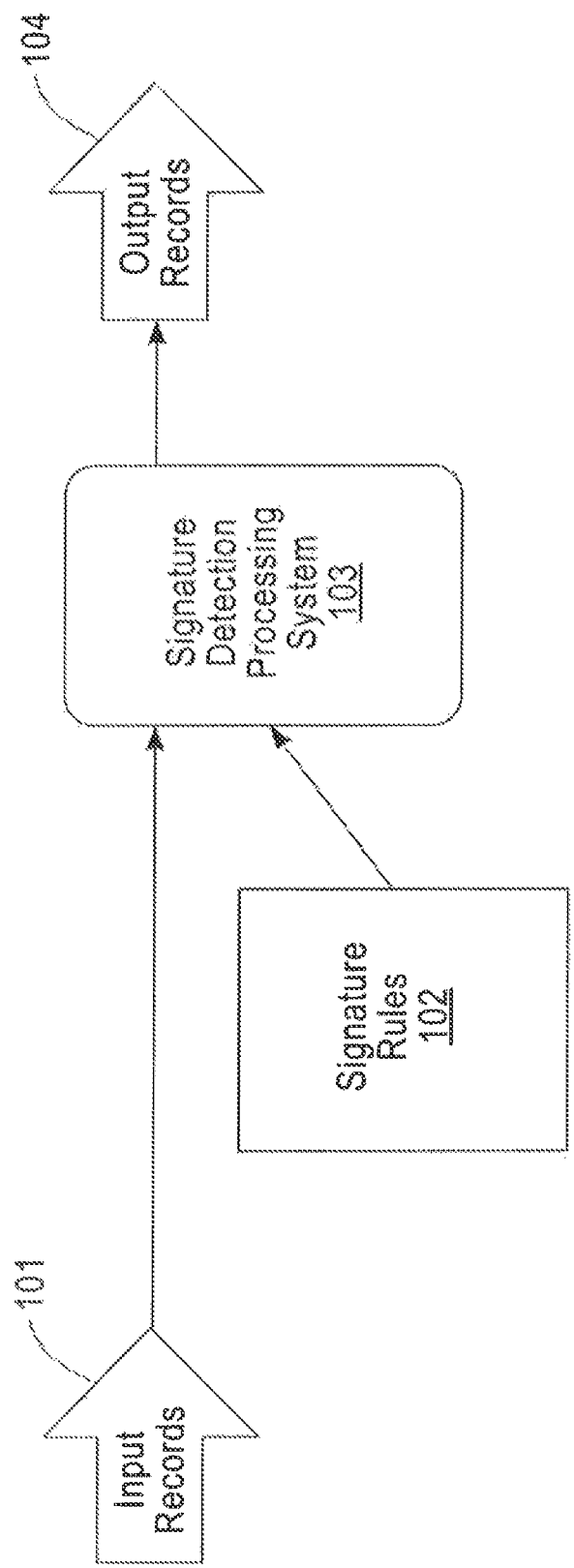
FIG. 1 illustrates a schematic overview of a signature detection process according to an embodiment of the disclosure.

Exemplary embodiments of the disclosure as described herein generally include methods for multicategory classification of streaming data records using signature detection rules. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

FIG. 1 illustrates a schematic overview of a signature detection process according to an embodiment of the disclosure. Referring now to the figure, a signature detection process begins with the arrival of input records in a data stream at block 101. The arrival rate of the input records can be high, for example, hundreds of thousands of records arriving each second. The input records have a fixed field structure so that each record contains a known number of data fields of known data types. These data types may also include easily parsable variant structures and delimited sequences with a detectable number of contained elements. The analytic requirement is that each input record is to be classified into one of a potentially large number of categories, for example, hundreds or thousands, as quickly as possible after that input record arrives and is available for analysis. Each category is identified by a signature rule which comprises an arbitrary Boolean expression involving AND's NOTs, ORs of predicate tests on the individual fields of the record. As discussed above, the predicate tests may include:

simple regular expression (RE) pattern matches on string fields, involving fixed subsequences, wildcard characters, and alternates;

key string tests on string types;

test for fields starting or ending with RE patterns;

equality and value set tests for all field types; and range checks for integer and floating point types, and for more complex types with numeric components such as IP addresses.

Referring back to FIG. 1, block 102 represents a file of signature specifications that define all classification categories to be identified by analytics processing system 103. The signature rules file 102 can contain hundreds or thousands of rules, and is periodically updated, e.g., hourly, daily, or weekly, to reflect changes in signatures of interest. For each input record, the analytics processing system 103 determines its classification and then marks this record either as an updated field in the input record or appends an annotation to it. The resulting records are then written as an output stream 104.

This form of classifying records using signature rules is useful in many domains, such as analysis of telephone call metadata, detection of network intrusions, detection of improper trade patterns, etc. A file of signature records is typically created by a domain expert and changes from time to time to meet changing business interests.

FIG. 2 shows an exemplary signature specification file, according to an embodiment of the disclosure. A signature specification file includes an input record structure specification segment 201 that defines the names and types of each field in the input record and a signature rule segment 202 with a list of signature rule definitions. Each signature rule definition in segment 202 has the form of an IF . . . THEN statement. The IF clause in the signature definition specifies a Boolean combinatorial expression with base terms being predicate tests on named fields in the input record. The THEN clause specifies the signature matched in the Boolean expression if the IF clause evaluates to true.

As an illustrative example, rule 1 in segment 202 specifies that the signature "vbuzzer' is recognized in input records with field structure as specified in 201 if the raw_data field value matches regular expression "^[\x80\x90].*$" and the dest_ip_addr field is in the range 38.117.98.1-38.117.98.126.

It is often the case that there is an implied priority in the signature rules in the signature file. According to embodiments of the disclosure, it is sufficient to provide at most one signature match for any input record and the earliest signature in the sequence of rule definitions is the correct match for any input. This priority rule encourages organization of the signature definitions file so that high information content signature rules with greater business value are placed early in the sequence. More generic rules with some but less analytic and business value are placed toward the end of the rules in the signature file.

Those skilled in the art will recognize that the information in the signature specification file can be organized in other standard formats, such as XML or JSON. The format used in FIG. 2 is exemplary and non-limiting, and was chosen as a convenient readable illustration of a possible format. Practical signature files may also be much larger, involving hundreds or thousands of signature rules.

Figure 3:
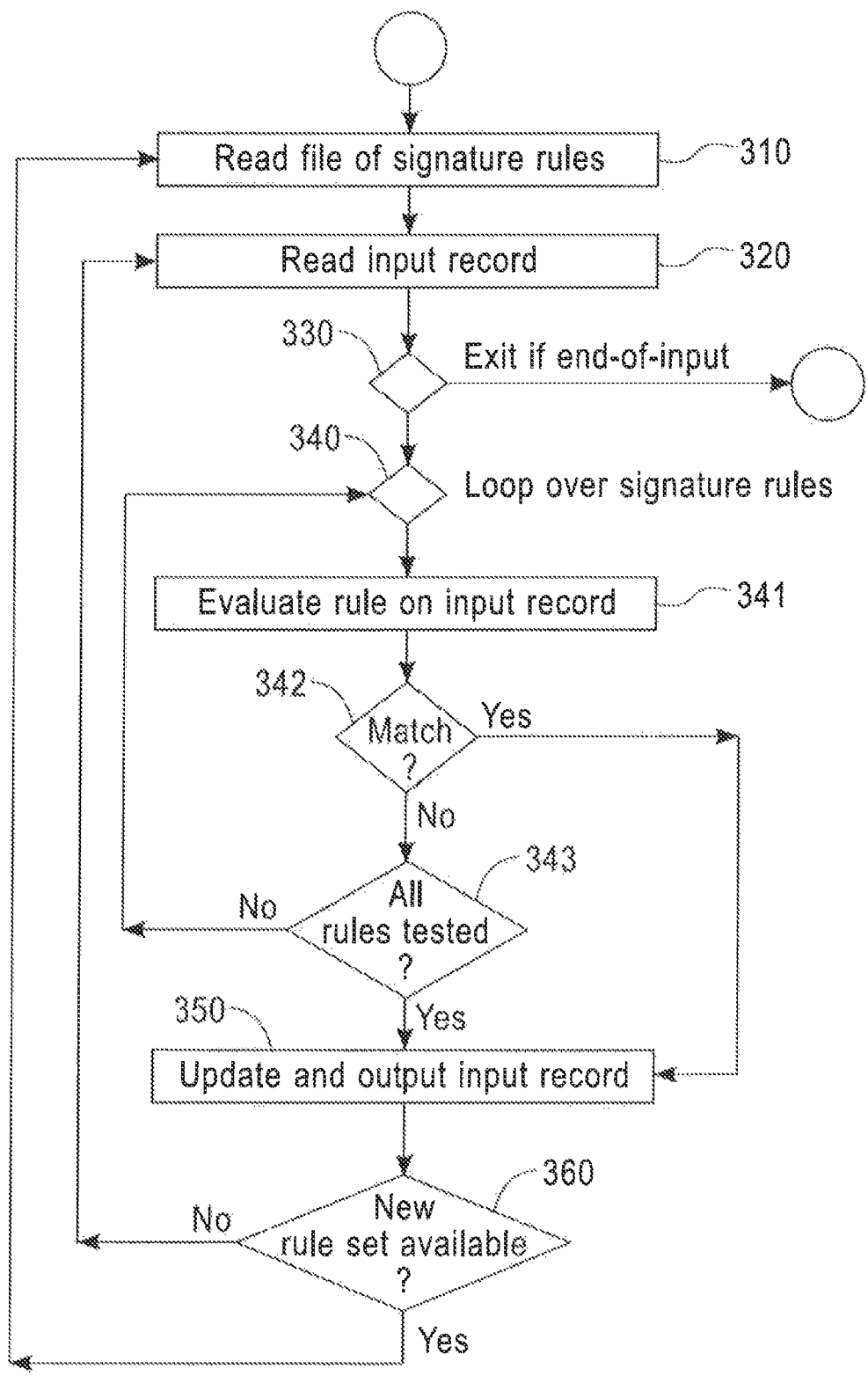
FIG. 3 is a flow diagram of a conventional linear signature detection process, according to an embodiment of the disclosure.

FIG. 3 is a flow diagram of a conventional linear signature detection process, such as that illustrated by processing element 103 from FIG. 1, according to an embodiment of the disclosure. In this figure, an arriving stream of input elements corresponding to block 101 from FIG. 1 and a signature definition file of n signature rules corresponding to block 102 of FIG. 1 are processed, and a stream of updated or annotated output records corresponding block 104 in FIG. 1 is output.

The flow chart of FIG. 3 represents a high level flow of a conventional signature detection implementation. Referring now to the figure, signature detection processing is initialized at step 310 by reading the file of signature rules 102, parsing it and storing it in memory as a list of test specifications which can be interpreted or executed as needed. At step 320, an input record is read, and at step 330, if an end-of file is reached for the input record stream, the process exits. Otherwise, for each input record, an inner loop for each signature rule is started at step 340. In each iteration of this inner loop, the next signature rule is evaluated at step 341 with field values of the current input record. If, at step 342, the input record matches this signature, then the inner loop is exited, as a highest priority signature match has been found. Otherwise, at step 343, if there are no more signature rules to be matched, i.e. the end of the signature rule list has been reached, the inner loop is exited as there is no matching signature for this input record. If the end of the signature rule list has not been reached, control returns to step 340 for the next inner loop iteration and the next signature rule is processed.

Upon return from the inner loop through signature rules, either the first matching signature has been found or there is no matching signature for this input record. This input record is either updated or annotated with the signature matching results and written to the output stream 104 at step 350. Step 360 tests whether a refreshed new signature ruleset is available. If yes, a control returns to step 310 to read and use the new signature ruleset, otherwise control returns to step 320 to start the next iteration of the input record loop, possibly waiting for the next input record to arrive.

The amount of processing required in a conventional signature detection processing flow increases linearly with the number of signature rules being evaluated, as over time, applications are enhanced to add more signatures. In that sense, it is not scalable for signature detection with large rule sets. In addition, a situation in which no match to any signature can occur frequently, which forces a scan of all rules. Furthermore, the requirement that high precedence signature rules that carry more information should be detected in preference to lower precedence but more frequently occurring signatures can prevent the ruleset from being reordered to allow early exit from processing in the most frequently occurring cases. Those skilled in the art will recognize that the conventional algorithm illustrated in FIG. 3 can be parallelized by starting multiple threads or multiple processes, each handling separate subsets of input records. Parallelization will increase the total throughput of a signature detection process, but does not improve its scalability. The achievable processing rate of input records per applied processing core will be the same whether or not parallelization is used. Hence a conventional algorithm such as that illustrated in FIG. 3 is not scalable to large signature rule sets in contexts where the there are limitations on processing cost.

Figure 4:
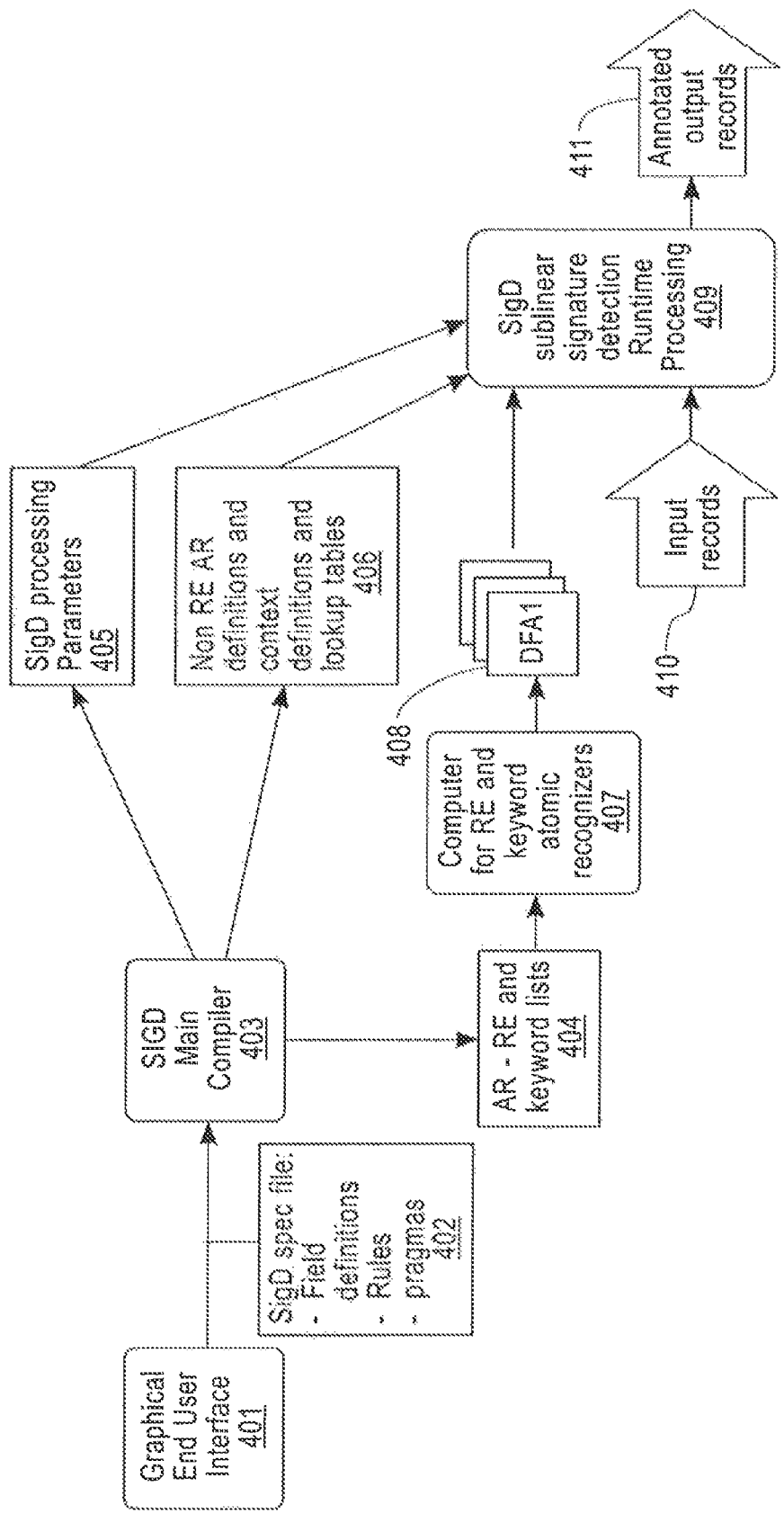
FIG. 4 is a flow diagram of a sublinear signature detection process according to an embodiment of the disclosure.

FIG. 4 is a flow diagram of a sublinear signature detection process according to an embodiment of the disclosure. In this figure, block 402 represents a signature detection specification file with essentially the same information as the specification file 302, as illustrated in the example of FIG. 2. Block 401 represents a graphical user interface (GUI) used by a domain expert end user to construct a signature file that accurately meets current business and user needs. Block 403 represents a signature detection compiler, which converts an input list of signature rules into: (1) a set of atomic recognizers (AR's); and (2) a set of rule evaluation contexts. According to an embodiment of the disclosure, the atomic recognizers for a signature ruleset can be defined as follows: For each field defined in the input record field structure, and for each type of predicate test (i.e., equality test, RE match, range test, etc.), an AR is defined as a logic function which takes the input record field value as input and has either memory lookup tables or character at a time deterministic finite state automata processing to determine which of the different rule values for this <field, predicate-type> tuple corresponds to this input. An exemplary, non-limiting memory lookup table is a hash table.

Using an approach according to an embodiment of the disclosure, a finite set of ARs will be generated for any signature rule set. Each of these AR's can have one or more memory lookup structures to be applied in sequence. By evaluating the AR once for any input field value, a list of all successful predicate matches on that input field will be returned, for all predicates of that type occurring in any of the rules in the signature rule set. Types of predicates for which this is possible were listed in the original definition of signature detection, above.

In addition to identifying Atomic Recognizers required for a particular list of signature rule definitions, a signature detection compiler 403 can also extract a set of contexts. According to embodiments, the contexts of a signature rule set are used with combinatorial Boolean expressions that combine individual field predicate evaluations into signature matches.

Now, it is known that any set of Boolean expressions over atomic predicates can be converted to an equivalent set of Boolean expressions in conjunctive normal form. In this form, all the OR's are on the outside and are equivalent to having independent rules in the ruleset evaluating to the same matched signature result. All the AND conditions are in the middle, and the NOT conditions are tightly bound with atomic predicates. The syntax and structure of the signature definition file 402 and guidance provided by the end user graphical tool 401 can ensure that the signature definitions are in conjunctive normal form as they are received by the signature detection compiler 403.

According to an embodiment of the disclosure, given a signature rule of the form:

If $(ARi_1(input)=x_1)$ AND $(ARi_2(input)=x_2)$ AND . . . $(ARi_m(input)=x_m)$ then signature=s, the context of the signature rule can be defined as the subsequence of ARs, in this case $ARi_1, ARi_2, \ldots, ARi_m$ used and "ANDed" together as a central part of conditions in the rule. Since AND operations are commutative and associative, the ARs in such a sequence are always subsequences of some canonical ordering of the ARs of the ruleset. Then, according to embodiments, a set of contexts of a signature rule set can be defined to be all subsequences of the canonical ordering of the ARs of the ruleset, which appear as the context of at least one signature rule in the set.

According to embodiments of the disclosure, canonical orderings can be defined for both the ARs and the contexts. A canonical order can be arbitrarily selected, but once selected, should be used consistently.

According to embodiments of the disclosure, a canonical ordering or the ARs is useful because:

(1) at runtime, there should be maintained, while sequencing through the contexts, a vector of those AR's have have been evaluated on a given input record, and if evaluated, what the result(s) were for each AR;

(2) during compilation, each signature rule is represented as a list of conditions:

$(ARi_1(input)=v1)$ AND $(ARi_2(input)=v2)$ AND . . . ;

this representation of the signature rules can be efficiently managed by identifying each ARi by its position or index into a selected, canonical sequence of ARs; and (3) when determining at compile time whether a new signature rule forces needs an additional context, it should be ensured that a signature using $(ARi_1(input)=v1)$ AND $(ARi_2(input)=v2)$ is placed in the same context as a signature using $(ARi_2(input)=v3)$ AND $(ARi_1(input)=v4)$, i.e. there should NOT be different orderings of AR conditions in the signature definition to cause generation of additional contexts. Since AND is commutative and associative, multi dimensional table lookup is not sensitive to the ordering of indices in lookup. According to embodiments, a canonical AR ordering ensures that the same ordering can be used for all of the above purposes.

There are many ways to select a particular canonical AR ordering. According to embodiments, a possible canonical AR ordering is as follows. Note that the fields in an input tuple typically have a built in ordering: $field_1$, $field_2$, $field_3$, . . . , $field_M$ representing the order in which data items are arranged in each input record. For a set of AR modes used in a signature rule set, a fixed ordering of AR modes can be defined as:

$ARmode_1$=exact string lookup;
$ARmode_2$=string non overlapping set lookup;
$ARmode_3$=integer ranges and values;
$ARmode_4$=ipaddress range,
$ARmode_5$=RE match; etc.

Now each AR corresponds to a particular ARmode being applied to a particular field in an input tuple, and can be represented by a pair <field_index, ARmode_index>. Then, a canonical ordering of AR's according to an embodiment of the disclosure is the lexicographic ordering of <field_index, ARmode_index> pairs for the AR's used in the signature rule set. In this embodiment, a signature rule set using AR's corresponding to, for example:

{$ARmode_1$ applied to $field_1$, $ARmode_3$ applied to $field_1$, $ARmMode_2$ applied to $field_2$, $ARmode_5$ applied to $field_2$, $ARmode_1$ applied to $field_3$} would have a canonical AR ordering:
1: <$field_1$, $ARmode_1$>;
2: <$field_1$, $ARmode_3$>;
3: <$field_2$, $ARmode_2$>;
4: <$field_3$, $ARmode_1$>;
5: <$field_3$, ARmode5>.

According to embodiments of the disclosure, a canonical ordering of the contexts is also useful:

(1) to sequence context lookup processing;
(2) to compute quit levels that determine when processing can be stopped; and
(3) to create, in the compiler, diagnostic tables of which signatures are resolved in which context.

There are many ways to select a particular canonical context ordering. According to embodiments, a possible canonical context ordering is as follows.

Each context can be represented as a set of AR's whose results are used to lookup signatures resolved by that context. According to an embodiment, a canonical ordering of AR's can be used to make unique the identification of a context as a sequence of AR's, by having the AR's in the context identification be in increasing canonical AR order. So, according to an embodiment, <$AR_1$> is a valid context identification, as is <$AR_1$, $AR_2$>; but <$AR_3$, $AR_2$> would be disallowed as a context identification because its sequence of AR's does not appear in canonical AR order. A canonical ordering of contexts according to an embodiment is a selected ordering of these unique context identifiers. It is efficient in terms of enabling early an quit of signature processing at run-time, for contexts in which high precedence signature rules are resolved come before contexts which resolve low precedence signature rules in the canonical context ordering. So, according to an embodiment, a canonical context ordering sorts the above identifiers of contexts as subsequences of the canonically ordered AR set, in order of their first appearance in the signature rule precedence order for the ruleset.

According to embodiments, identifying contexts for a signature ruleset enables construction of a look up table for each context. The lookup table for a context of p AR's will be a p-dimensional table. For each set of possible AR values for the sequence of AR's appearing in that context, a single lookup is performed in this table to determine whether the given input record matches any rule with that context. The lookup table entries also include a NOT_FOUND value, that can be used for combinations of AR values which do not appear in any rule of the ruleset. The NOT_FOUND value can also be used to ensure accurate encoding of negative conditions such as:

signature s is matched if $(ARi_1(input)=x_1)$ AND NOT $(ARi_2(input)=x_2)$

According to embodiments, it has been observed experimentally that for many useful data analysis rulesets and types of Atomic Recognizer predicates, the number of contexts is much smaller that the number of rules in the ruleset. Hence there is significant increase in processing efficiency and feasible rate of signature detection per processing core. This is increasingly true as the number of rules in signature rulesets increases. Since large rulesets and fine grained classification of incoming data records has business value, this improvement is significant.

According to embodiments, the reduction of a conjunctive normal form ruleset to a set of ARs and ruleset contexts results in a sub-linear increase in processing requirements as the number of rules in the ruleset becomes large, whereas conventional signature detection methods do not have this property. This organization of the signature detection processing also ensures that each field of each input record is scanned at most once per AR type, which is another source of efficiency relative to conventional signature detection methods.

According to embodiments, the signature detection main compiler 403 can: (1) identify and provide a specification for each AR used in the ruleset; (2) sort these AR's into a canonical order; (3) identify the contexts used in all rules of the ruleset; and (4) construct the context lookup table for each identified context that identifies signatures found or NOT_FOUND for each possible set of AR result values corresponding to that particular subset of the AR's. In addition, the signature detection main compiler can sort the contexts into a canonical order, and determines when it is safe to quit looking up contexts because no higher precedence match can be found in the remaining unprocessed contexts. A more detailed description of the signature detection main compiler is provided with regard to FIG. 5.

According to embodiments, the output of the signature detection main compiler 403 includes AR definitions and Context tables 406, which have been described above, and a parameter block 405. Parameter block 405 includes information describing (1) the field structure of the input records, which are needed to parse them at run time, and (2) file locations for the context and AR tables in 406, so that these tables can be located and read at run-time processing initialization time. In addition the signature detection main compiler 403 outputs AR specifications 404 for string oriented ARs involving RE pattern matching, key word searches and associated character by character string predicates. These string pattern matching AR specifications can be converted by known methods, represented by string pattern convertor 407, into deterministic finite state automata tables 408 which can be executed efficiently at run-time. The may be one or more output table 408 for each AR specification provided, and their file locations are included in the parameter table 405. These known conversion methods include the Ragel DFA Compiler, the Aho Korasick keyword lookup algorithm and the method disclosed in "Rapid Searching and Matching of Data to a dynamic Set of Signatures Facilitating Parallel Processing and Hardware Acceleration", U.S. patent application Ser. No. 14/584,516 filed on Dec. 29, 2014, the contents of which are herein incorporated by reference in their entirety.

The sublinear signature detection process of FIG. 4 also includes a sublinear signature detection runtime processor 409 that processes a stream of input records 410 on which signature detection is to be performed, and outputs an annotated or updated stream of output records 411 that include the signature classification information. What makes a processing according to embodiment of the disclosure sublinear is that rather than iterate through each of the rules for each input record, it uses the provided context information, context look up tables, and AR and DFA specifications in elements 406 and 408, so that the processing for each input record is then an iteration through contexts with one or possibly a small number of table lookup operations required at run-time for each context. Note that context, the set of atomic recognizers (ARs), the set of contexts, the context look-up table and the DFA tables are regenerated when the list of signature detection rules is dynamically refreshed. A more detailed description of the signature detection runtime processor is provided with regard to FIG. 6.

According to embodiments, the number of contexts is typically an order of magnitude less than the number of signatures.

Figure 5:
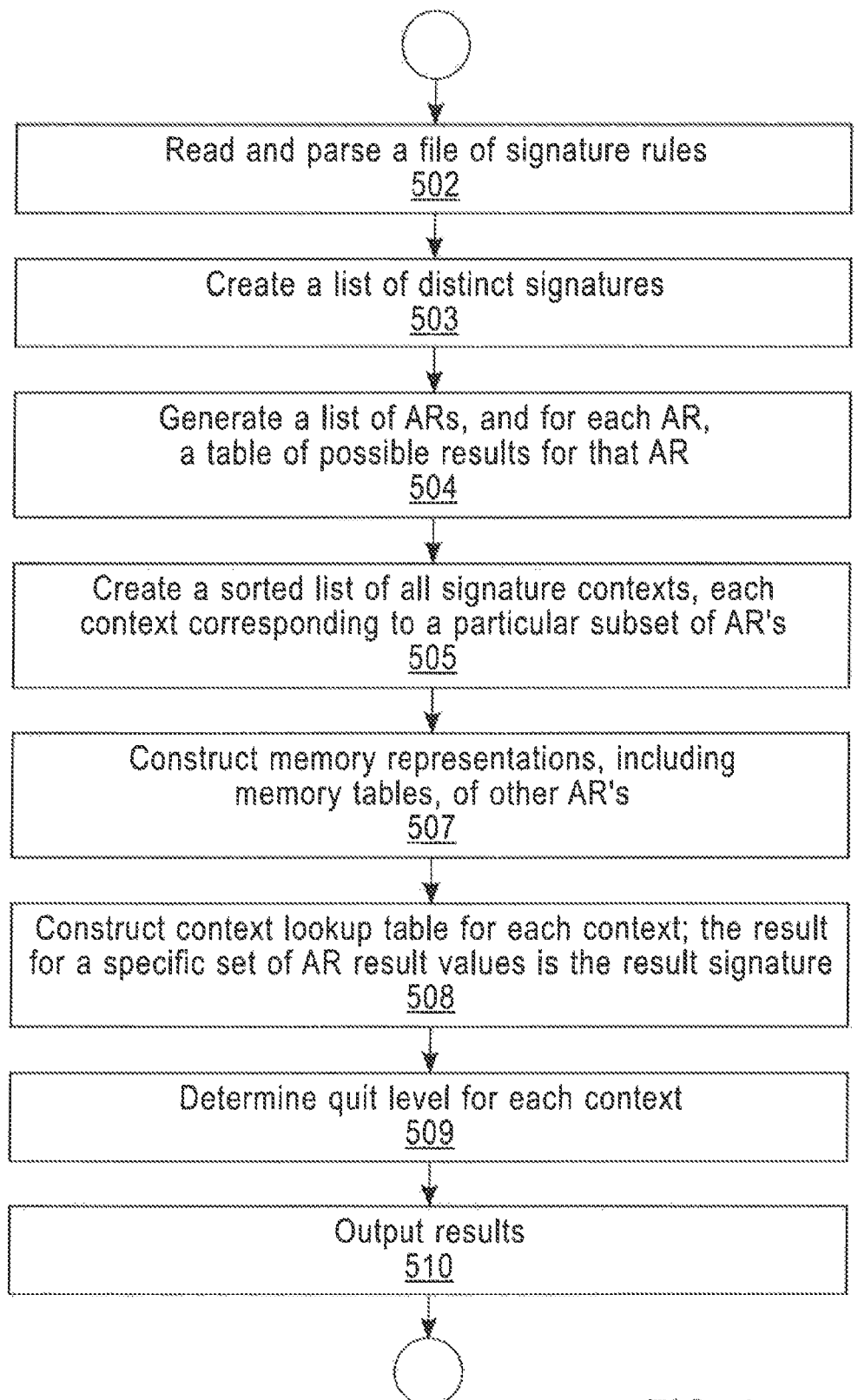
FIG. 5 is a flow diagram of a sublinear signature detection compilation process according to an embodiment of the disclosure.

FIG. 5 is a flow diagram of a sublinear signature detection compilation process according to an embodiment of the disclosure. Referring now to the figure, a process starts at step 502 by reading a file of signature rules into memory and parsing it. According to an embodiment, it can be assumed that the signature rules are already in conjunctive normal form enforced either through the syntax of the input file 402 (see FIG. 4) or by guidance from the GUI 401 (see FIG. 4) to a signature ruleset developer. Next, in step 503, a list of distinct signatures is created. Now, each rule can be updated to refer to its result signature by a signature index to this list. Next, in step 504, a list of Atomic Recognizers (ARs), and for each AR, a table of possible results for that AR, is generated. This organization of AR result values allows each possible AR result in the context lookup tables to be referred to by its AR result index, which is a position in this ordered list of AR results.

According to embodiment, the AR list is generated by listing, for each field in the input signature rules file, the different types of AR predicates used on that list. For example: is this field a string field with a RE or key word, or does the field have "starts with" or "ends with" type matches. Other AR types correspond to integer or address fields with either ranges or specified sets of possible match values. In addition, at step 504, the discovered AR's are sorted into a canonical order.

With the ARs in canonical order, compile time step 505 iterates through all the signature rules to identify and create a sorted list of all signature contexts, with each context corresponding to a particular subset of the generated AR's. According to an embodiment, the contexts can be sorted in the order in which they first appear in the precedence ordering of the signature ruleset, however, other embodiments are not limited thereto. This sorting can facilitate an early process exit when a signature is detected after all higher precedence signatures have been checked for. Each signature rule will be resolved in a particular context in the context list. Maintaining this association for each signature rule facilitates both exiting the process and generating explanations of the behavior of the system for an end user.

In step 507, memory representations of other AR's are constructed, particularly for those dealing with value sets and value ranges for integer, floating point and address fields. In addition, those AR's which do not require RE or keyword compilation are processed and converted into memory tables that can enable processing of a given input field value to determine values for all rules in the set. In most cases this reduces to one or more hash tables or branching structure lookup operations.

In step 508, the context lookup table is constructed for each context. The dimensionality of each context table is the number of AR's involved. The number of elements in each dimension is the number of possible output values of the corresponding AR. Some ARs have the capability to return a "NO AR MATCH" result, which should be accommodated in the creation of context lookup tables. Then, for each context, and for each rule resolved by that context, the lookup table result corresponding to that specific set of AR result values is set to be the result signature. All context table positions that do not correspond to a rule in the result set are populated with the "NO MATCH FOUND" value. Then given any set of AR values returned from processing a single input record for the set of AR's corresponding to this context, a single lookup can be performed in the context table and to determine whether any rule resolved by that context was matched, and if so, to know the resulting signature.

In step 509, the quit level for each context is determined by making a pass through the contexts in order, to determine, for each context, the number of preceding signature rules in the precedence order that have already been resolved in this or a higher precedence context. If, at run time, it is discovered after processing a context p a match for the input record to a signature n, and n has a higher precedence than the quit level for context p, then there is no reason to look at any further contexts, as a higher precedence match will not be found.

In step 510, results are written out to file to be accessible for signature detection run-time processing. According to embodiments, these results include the specifications of the string AR's dealing with RE matching, keyword search, beginning and ending substrings, etc., are written out to file to create the AR specifications 404, and to facilitate the use of existing tools to generate a deterministic finite state automata representation that specifies the required AR runtime logic.

According to embodiments, these results also include parameters, such as the description of the format, i.e., field names and field types of the input records, and may also include location information to find compiled AR tables, particularly for deterministic finite automata (DFA) files for string processing. The parameters were represented by element 405 in FIG. 4. In addition, the results include context definitions, tables, non-string AR tables, and quit level information, which are organized into an easily parsable format and then written out to the file system to be accessible to the runtime processor.

The compilation flow described in FIG. 5 is exemplary and non-limiting, and the steps may be reordered or have functions regrouped in other embodiments without changing the basic behavior of a signature detection compilation processing.

Figure 6A:
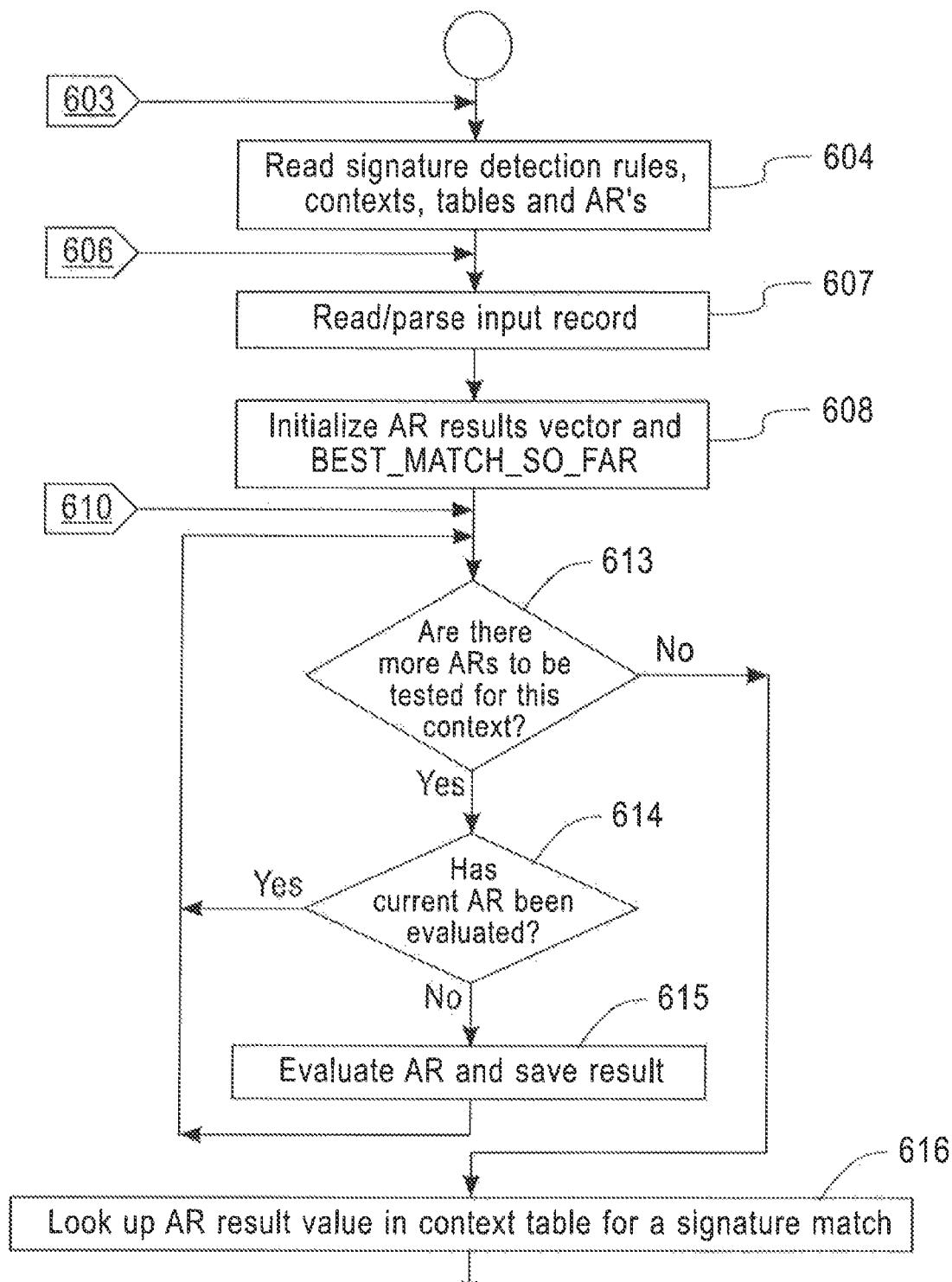
FIGS. 6A-6B is a flow diagram of a sublinear signature detection run-time process according to an embodiment of the disclosure.
Figure 6B:
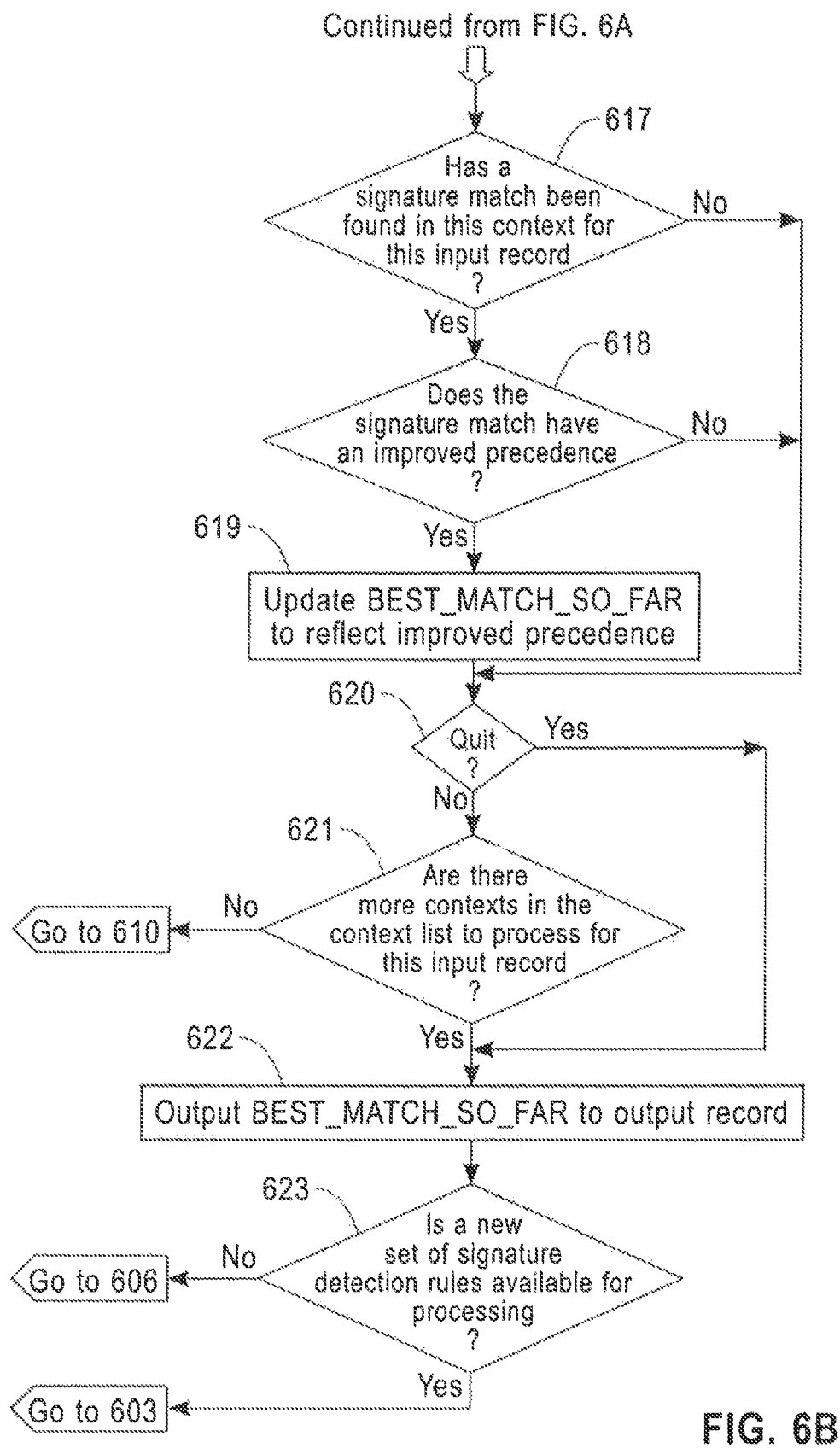

FIGS. 6A-6B is a flow diagram of a processing method performed by the sublinear signature detection runtime processor of block 409 of FIG. 4 which allows multiple refreshes of the signature rule table, according to an embodiment of the disclosure. Referring now to the figure, a run time flow begins with label 603, which indicates when a new iteration of reading and initializing signature detection runtime record processing begins with a new set of signature ruleset definitions. When signature detection run time according to an embodiment starts for the first time, there will always be parameters 405, context definitions, context lookup tables and executable AR specifications 406, 408 available.

At block 604, the parameters 405, context definition, context lookup tables and non RE AR executable specifications 406, and the RE and key word executable specifications 408, are read from files into memory, and are parsed and processed so that all AR's can be executed.

Label 606 represents the start of an inner loop for processing and signature detection on an input record from the input stream 410.

In block 607, a new input record is read into memory from the input record stream 410 and parsed. After parsing, the value of each of the fields in this input record will be available for processing. The fields were identified by name and type in the input record structure definition 201 and read as part of the parameter specification 405.

In block 608, the state variables used to track progress of signature detection processing of a single input record are initialized. These state variables include the AR result vector. This vector has one entry for each AR defined for the current ruleset. For each AR, the result of running that AR on the appropriate field of the current input record can be stored in the AR's entry in the AR result vector. It is also possible to store the value "NOT_YET_EVALUATED", represented in some compact form, in each entry of the AR result Vector. According to embodiments, the AR result vector is initialized in block 608 so that each entry has the value "NOT_YET_EVALUATED". When in subsequent processing an AR is evaluated on the input record, the result will be stored in the AR result vector. The AR Result vector is used to ensure that no AR is evaluated more than once when performing signature detection on any individual input record.

A second state variable initialized in block 608 is BEST_MATCH_SO_FAR.

This is initialized to the lowest possible precedence signature detection result, which is typically "NO_MATCH_FOUND". As signature matches are detected during the processing of a single input record, this state variable BEST_MATCH_SO_FAR will be updated to reflect that a signature match with a rule of higher precedence has been found. Processing will end when a context quit level indicates that no further improvement in the precedence of BEST_MATCH_SO_FAR is possible in subsequent contexts.

After initializing the state variables for signature detection on a single input record, processing proceeds to a loop that iterates through the signature contexts of the current ruleset in context order. Label 610 indicates the start of processing of the next signature context of the current ruleset. The number and order of contexts are received or read in from the contexts definition information 406.

Each context evaluates a specific set of AR's on the current input record. It is the result from these AR's which taken together make a valid lookup in the context table. A loop through each of the AR's for the current context begins at block 611. Conditional block 613 tests whether there are more AR's for this context to be inspected. If yes, then there is at least one more required AR to be inspected, and control flows to conditional block 614 which tests whether this next AR has already been evaluated on the current input record. This would have occurred if that AR was needed for this input record for an earlier context in the context sequence. By looking at the AR result vector, it can be determined whether this AR is already evaluated and if so what the result was.

If the result of conditional block 614 is no, then in block 615 the AR is evaluated on the current input record and the AR result value is saved into the AR result vector. Control flows back to conditional block 613 to test whether there are more required ARs for this context and possibly evaluate them. If the result of conditional block 614 is yes, there is nothing to be done for this required AR, as its result on the current input record is already known, and control flows back to conditional block 613 to resume inspection of the next AR. According to embodiments, this logic can ensure that no AR is evaluated more than once on any input record during signature detection processing.

If the result of conditional element 613 is no, then the end of the required ARs list for this context has been reached, and the result value for each AR needed for this context is known. Control flows to block 616 to lookup in the context table to determine whether there is a signature match.

According to an embodiment, a simple case of context table lookup occurs when all AR's for the context return a value of "NO_AR_MATCH" or a single match result. Since this provides a single set of lookup indexes into the context lookup table, then a single lookup in this table will determine if there is a signature rule match for this context. If there is no signature rule match, a "NO_SIG_MATCH" value is found at this position in the context lookup table. AR's can return multiple values if they identify overlapping value sets. If one or more ARs for a context return more than one result value, then all possible combinations of AR results are tested and a single table lookup is performed for each combination.

Performing a combinatorial number of table lookups can be a performance and scalability issue. However, the signature detection main compiler 403 can detect multivalued ARs during AR processing 507. According to an embodiment, if overlapping AR result sets are replaced with disjoint set intersections, it is possible to force an AR to be single valued, represent each desired value set as a union of disjoint subsets, have the AR return the disjoint subset index, and code the desired rule set unions as additional matching values in the context lookup table. According to an embodiment, if multi valued ARs are detected early in the GUI 401, then a ruleset designer can be warned of potential signature detection processing costs and persuaded to replace the overlapping rules with an equivalent ruleset with single valued AR's.

According to an embodiment, the flow in FIGS. 6A-6B can handle single valued ARs returning at most one signature match in each context. However, those skilled in the art will be able to extend this to iterate through all possible combinatorial matches in the case of multivalued AR's, assuming this issue was not prevented by the compilation and specification time avoidance techniques described above.

With this assumption, conditional block 617 tests whether a signature match has been found in this context for this input record. If yes, a signature match has been found in the current context, and control flows to conditional block 618, which compares the precedence of the signature match found in this context with the precedence of the previously saved BEST_MATCH_SO_FAR. If the signature match found in the current context is an improvement in precedence, then the state variable BEST_MATCH_SO_FAR is updated at block 619 to reflect the higher precedence signature match from the current context. Alternatively if there is no improvement, the no branch is taken from element 618 and no change is made to BEST_MATCH_SO_FAR. If the result from conditional block 617 is no, then no signature match has been found by processing the current context, and no change is made to BEST_MATCH_SO_FAR.

Signature matching for the current context is now complete and control flows to conditional block 620 to determine whether more contexts in the context sequence need to be processed, or whether signature matching can quit. In conditional block 620, the precedence of the best_MATCH_SO_FAR is compared with the quit level for the context which was provided as part of the context specification 406. If the BEST_MATCH_SO_FAR has higher precedence than the quit level, then the following contexts cannot yield an improved signature match, and processing of the current record ceases. Hence, in processing block 622, BEST_MATCH_SO_FAR is written into the output record or possibly attached as an annotation. If BEST_MATCH_SO_FAR has lower precedence than the quit level of the current context, then processing continues to the next context and control flows to conditional block 621. Those skilled in the art will note that it is possible to eliminate the last context test 621, by ensuring that the quit level of the last context in the context order has value of lower precedence than "NO_MATCH_FOUND". This test is illustrated in the figure for clarity of exposition and simplicity of implementation.

Conditional block 621 tests whether there are more contexts to process for this input record in the defined context sequence. If yes, the next iteration of the context loop begins and control flows to next context at label 610. If no, the final context has already been processed and there are no more contexts to check, at which point BEST_MATCH_SO_FAR is the best, i.e. highest precedence, signature match. Hence control flows to block 622 and this value is written into or added as an annotation to the output record. Notice that BEST_MATCH_SO_FAR was initialized in state variables initialization in block 608 at the start of processing for this input record to "NO_MATCH_FOUND". If no context has found a signature match, i.e., all successful matches will have higher priority than "NO_MATCH_FOUND", then "NO_MATCH_FOUND" will be the written output for this record by block 622.

At this point, a signature detection according to an embodiment for the current input record is complete. The remaining task is to determine whether a new ruleset has been compiled and is available for use with the next record or whether the current rule set should continue to be used. Conditional block 623 makes this test. If yes, when a new ruleset is available, control flows to label 603 to begin a new ruleset iteration and to read in the refreshed ruleset archives before the next input record is read. If no, control flows to label 606, and a new input record iteration begins.

It is to be understood that a run time processing embodiment described in FIG. 6 is exemplary and non-limiting. According to an, it is structured as a continuous open ended flow with no completion. According to embodiments, the algorithm of FIG. 6 can be parallelized with different threads or processes handling different input records concurrently. However, if there is a ruleset refresh, all processes and threads need to start using the new ruleset in a coherent way.

FIG. 7 illustrates an example small symbolic signature rule set and some sublinear signature detection tables and generated structures, according to an embodiment of the disclosure.

Referring to the figure, according to an embodiment, block 701 contains a starting example of a prioritized signature rule set. In this illustrative example, there are nine signature rules s1, s2, s9. There are three atomic recognizers X, Y, and Z. For the purposes of the example, it is not necessary to provided details of the input record field structure. It is sufficient to identify the AR's. So in words the first signature rule is:

If AR X has value x1 and AR Y has value y1 on an input record, then it is signature s1.

From this ruleset, it can be concluded that possible values of the AR X on an input record include: x1, x2, x3, x4, x5, x6. According to an embodiment, it can be assumed that the result "NO_AR_MATCH" can also be returned by AR X. This return value may be written as 0 for brevity. The AR Y has fewer relevant return values: y1, y5, y8, y9, and once again NO_AR_MATCH, encoded as a 0 return value.

Block 702 lists the signature matching contexts prompted by ruleset in 701. Specifically there are seven contexts:

X, X and Y, X and Z, X and Y and Z, Z, Y and Z, Y.

Note that these contexts are not in a canonical order. Block 702 also shows which rules are resolved in each context, illustrating that each rule in the ruleset is resolved in exactly one context. In this example, each rule will correspond to one positive match value in the context lookup table for the context where it is resolved, with no multivalued AR's and no NOT expressions. "NO_MATCH_FOUND" will be coded as zero in these tables.

Block 703 shows the context sequence and quit levels for the example of block 702. The contexts are sorted in the order of quit levels:

1:X 2:X and Y 3:X and Z 4:X and Y and Z 5:Z 6:Y and Z 7:Y

According to embodiments, there is some arbitrariness in defining the order. Having a context order where a rule high in the precedence order is resolved in a context occurring early in the context order will enable early quitting of the runtime processor. This embodiment also uses the rule that contexts involving single AR's are ordered before more complex contexts. Other context ordering approaches are possible in other embodiments.

Block 703 also shows the quit level computation for this example and the selected context sequence. For example, context X has quit level=0. This is because even if signature s2 or s4 or s6 are detected in the first context X, context X and Y would need to be evaluated because there might be a match to s1, where x1 and x2 are not excluded from being equal AR result values, and that signature would have precedence over an s3, s4, or s6 value. Inspection of the quit level values in block 703 shows that they define a signature number such that further context searching can be stopped if a signature of equal or lower index has been found. In this case, a signature with a low signature index values has higher precedence.

Block 704 shows an example context lookup table as built at runtime for Context X. This is a one dimensional lookup table since it has only one required AR. The possible values of AR X, as noted above, are (0, x1, x2, x3, x4, x5, x6) where 0 encodes "NO_AR_MATCH" for AR X. Block 704 shows that this lookup table can return successful match results on input values x2, x4 and x6 for signatures s2, s4 and s6, respectively, in response to AR X when applied to the input record. Other returned values from evaluating AR X may be used in other contexts but do not lead to a signature rule match in this context, i.e., based on the results of evaluating only AR X.

Block 705 shows a two dimensional lookup table corresponding to context Y and Z. A single signature rule match is possible in this context. Specifically, signature s8 is matched when AR Y yields value y8 and signature Z yields result z8 on the input. All other values in this two dimensional table are coded 0 for NO_MATCH_FOUND.

Figure 8B:
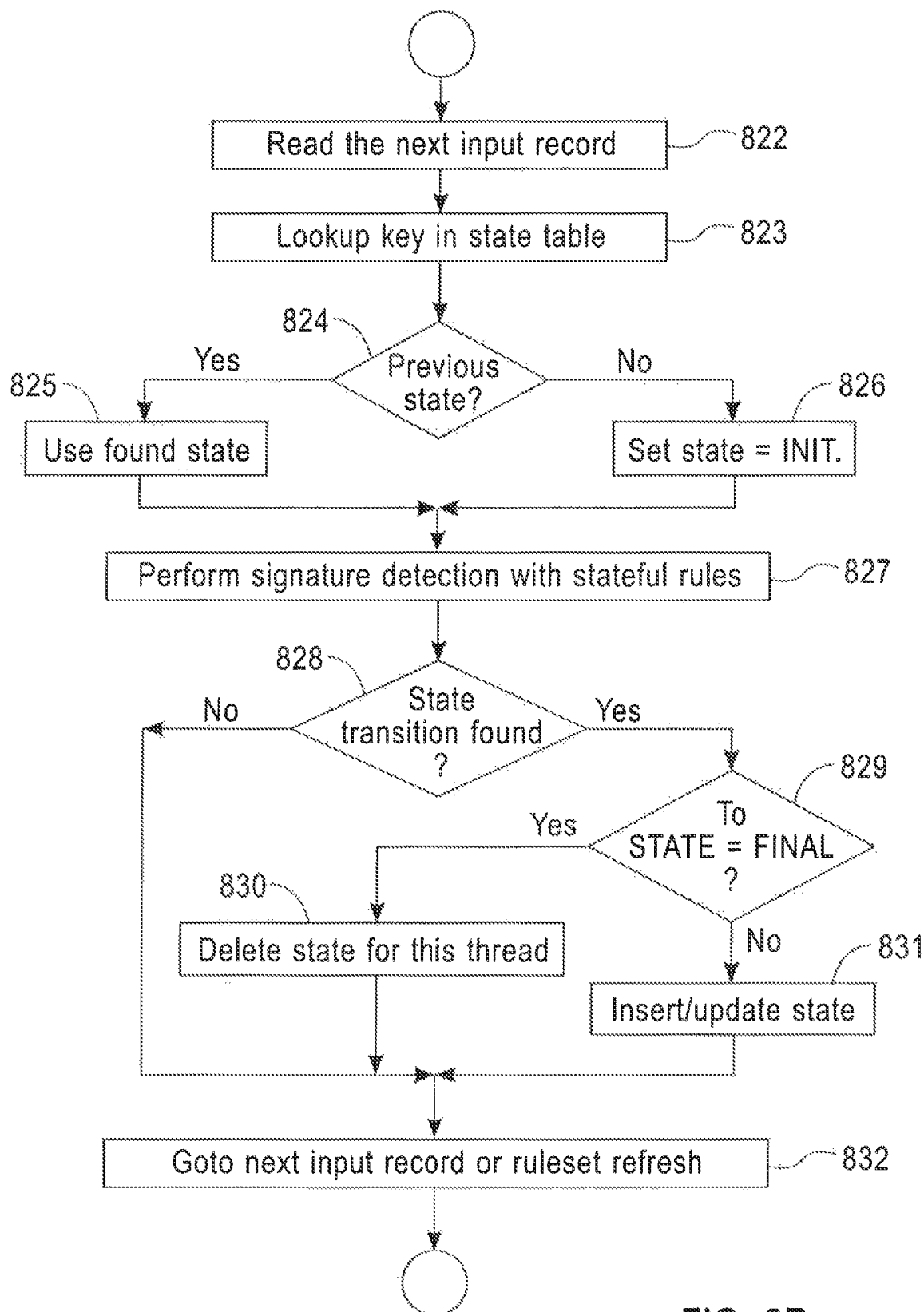

FIGS. 8A-8B illustrate an example ruleset and associated processing flow diagram according to an embodiment in which stateful rules for detecting signatures are being processed. FIG. 8A shows an example of a possible set of extensions to a signature rule specification that allows for signatures defined by stateful rules. This example shows an input record structure specification 801 similar to the input record structure specification 201 for a simple, stateless rules case illustrated in FIG. 2. The input record structure specifications 201 and 801 are substantially identical. Similarly, a signature ruleset according to an embodiment that includes stateful signature rules can include regular stateless rules. FIG. 8A also shows stateless rules 802 substantially identical to those shown for the stateless signature rules 202 in FIG. 2.

However, blocks 803 and 804 include one or more stateful signature rules, as opposed to the specifications shown in blocks 201 and 202 of FIG. 2, which include only stateless signature rules. Block 803 is a state-key specification, which is an extension to the input record structure specification that identifies which field or combination of fields in the input record are to be used as a state key. A state-key determines when input records should be considered to be related members of a sequence for the purpose of stateful rules processing. In block 803, the input record fields values dst_ip_addr and src_ip_addr will be concatenated and used as the state-key. In this case, the state-key combines two input record fields. Those skilled in the art will understand from this example how state-keys based on a single field or on more than two fields can also be defined.

Block 804 shows an example specification of stateful signature rules Rule 9 and Rule 10, in which stateful rules are added at the end of the rule set for the convenience of exposition. Stateful rules may occur anywhere in the signature rule set, and hence with any priority. Stateful rules are similar to other signature rules in that they have: an "if" part comprising a set of match conditions to be tested, typically a string of predicates combined with AND; and a "then" part specifying the signature found or more generally action to be taken when the data values in an input record satisfy the conditions in the "if" part. In a stateful signature rule, as shown in block 804, the predicate conditions in the "if" part of the rule can be any simple predicate test that uses atomic recognizers on the input field value, and can also include tests on a state value retrieved for this input record. In an embodiment illustrated in FIG. 8A, the test of an input record state is an equality test on the keyword FROM_STATE that compares the keyword with one of the value strings for possible state values. In block, 804, Rule 9 tests whether FROM_STATE is equal to the value INIT, and Rule 10 tests whether FROM_STATE is equal to the string "skype_state_1".

The action part of a stateful signature rule can have two possible forms, depending on whether the stateful signature rule is defining a transition to an intermediate state in which no signature has been recognized, or to a final state in which a sequence of signatures for this state key have been found which corresponds to a specific signature. In the case of an intermediate state transition rule, the action part to be executed when the "if" part of the rule has been successfully matched specifies just the TO_STATE to which a transition is to be made. The specified TO_STATE is a string value which can be stored as the state value associated with this state-key on completion of signature detection processing for this input record. According to an embodiment, final state-full signature rules can be identified by having TO_STATE=keyword FINAL. In addition to identifying itself as a final rule with TO_STATE=FINAL, a final stateful signature rule may identify the detected signature by name. In the example in block 804, Rule 9 is an intermediate state transition rule that, when its predicates are matched, transitions the state value for the state key of the input record to "skype_state_1", and Rule 10 is a final state-full transition rule that, when its predicates are matched, transitions the state value for the state key of the input record to FINAL and specifies that the signature "skype-state-sequence" has been detected for this input record. Note that Rules 9 and 10 are exemplary and non-limiting, and other embodiments can support stateful rulesets with a plurality of intermediate states.

The set of all possible state values for a stateful signature rule set can be determined at compile time by listing all non-FINAL TO_STATE values in the rule set. According to embodiments, INIT and FINAL are two predefined state values. When, for a given state-key value, no previously stored state value is found, the FROM_STATE is marked as INIT. When a transition to a FINAL state occurs, any previously stored state value for this state-key is deleted. When a transition to a non-FINAL state occurs in the action part of a matched intermediate state-full signature rule, the TO_STATE string value can be stored as the current state associated with that state-key value. That state will be retrieved when the next input record with this state-key value appears.

FIG. 8B is a flow diagram of a run time processing method for a set of signature rules that include stateful rules, according to an embodiment of the disclosure. The method of FIG. 8A is an extension of the flow diagram of the sublinear signature detection runtime processing method for stateless signature rules shown in FIG. 6. According to an embodiment, it can be assumed that the actions associated with block 604 have already occurred, and that a current ruleset, associated context tables and AR's have already been read in. Stateful ruleset runtime processing uses a state store table that initially has no state string for any state-key value. Referring now to the figure, a run time flow begins by reading the next input record at step 822. In step 823, the state-key value for this input record is determined using information provided in the state-key specification 803 about which input record fields are to be used and in which order to be combined. The state store table is searched to determine whether a state string has been saved for this state-key value during the processing of a previous input record with the same state-key value. At step 824, it is determined whether a previous state string has been found for this state key value. If YES, the state for this input record is set to the found state string value at step 825, and if NO, the state for the input record is set to the key string INIT at step 826.

At step 827, signature matching is performed for a set of mixed stateless and stateful signature rules. The processing of step 827 is substantially similar to that described for steps 608-621 of FIGS. 6A-B, the difference being that the state string of the input record is available along with the other fields from the input record, and an Atomic Recognizer that tests for state equality is present in the set of AR's.

After step 827, it is known whether a signature rule has been matched, and if it has, which is the highest priority signature rule match. At step 828, it is determined whether the highest priority matching rule is a stateful or a stateless signature rule. If NO, the matched rule is stateless, then control flows to step 832, which corresponds to steps 622-623 in FIG. 6B, where the result of signature matching is written as output, and it is determined whether an updated ruleset has been detected. After reading any updated signature detection rules and the next input record, control returns to step 822 to read and process the next input record.

If the YES branch is taken from step 828, then the matched signature rule is a stateful rule, in which case it is determined at step 829 whether the matched rule is a final state transition rule or an intermediate state transition rule. If the rule is an intermediate state transition rule, then, at step 831, the TO_STATE value for the matched rule is written into the state store as the state for the state-key of this input record. This may be a state update or a state insertion depending on whether this state-key value had a value when processing for this input record started. For an intermediate state transition rule match, there is no signature match in the rules for this input record; hence there is no output signature to be set. If the matched state transition rule is FINAL, then, at step 830, the signature associated with this final state transition is set as the matched signature for this input record and any previously state for the state-key of this input record is deleted from the state store. This deletion effectively sets the state of that state-key value to INIT without taking up space in the state store for that value. This corresponds to an embodiment where the number of possible state-key values is far greater than the number of state-keys with an active state at any point during input processing. Those skilled in the art will be able adapt this processing to embodiments where the number of possible state-key values is approximately the same as or less than the number of state-keys with an active state.

After steps 830 and 831, control flows to step 832, which corresponds to steps 622-623 in FIG. 6B, where the result of signature matching is written as output, and it is determined whether an updated ruleset has been detected. After reading any updated signature detection rules and the next input record, control returns to step 822 to read and process the next input record.

System Implementations

A signature detection system according to an embodiment of the disclosure is suitable for a cloud implementation. According to embodiments, a run-time recognizer and compiler can be placed in the cloud, and a Graphical enduser interface can be implemented as a browser application in the Cloud to help user build their signature rule files. According to embodiments, cloud connectivity to raw data for signature detection can be used to scale a signature detection compilation and run time recognizer according to an embodiment to whatever level is desirable.

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
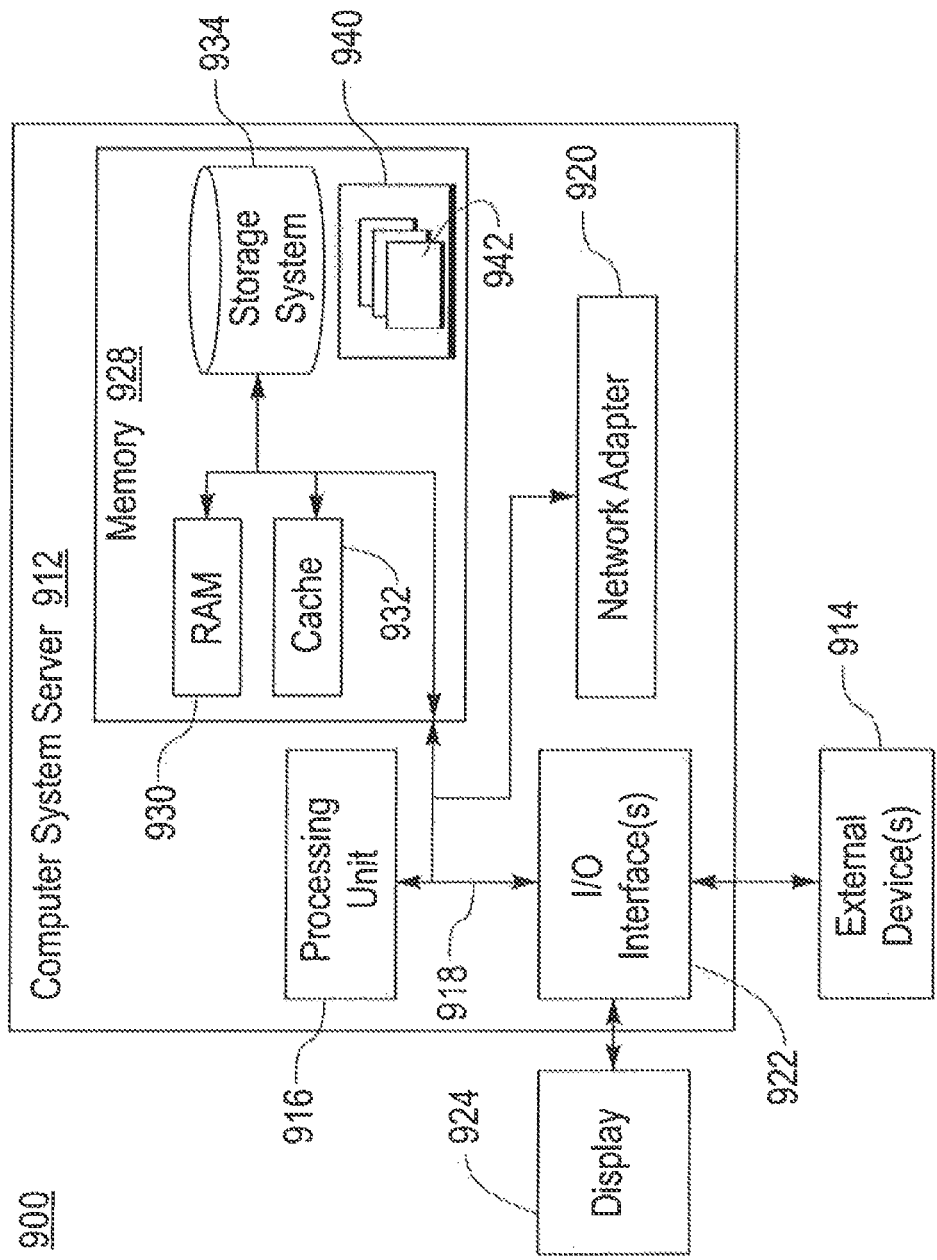
FIG. 9 depicts a cloud computing node according to an embodiment of the present invention.

Referring now to FIG. 9, a schematic of an example of a cloud computing node is shown. Cloud computing node 910 is only one example of a suitable cloud computing node and is not intended to suggest any limitation as to the scope of use or functionality of embodiments of the disclosure described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the disclosure as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
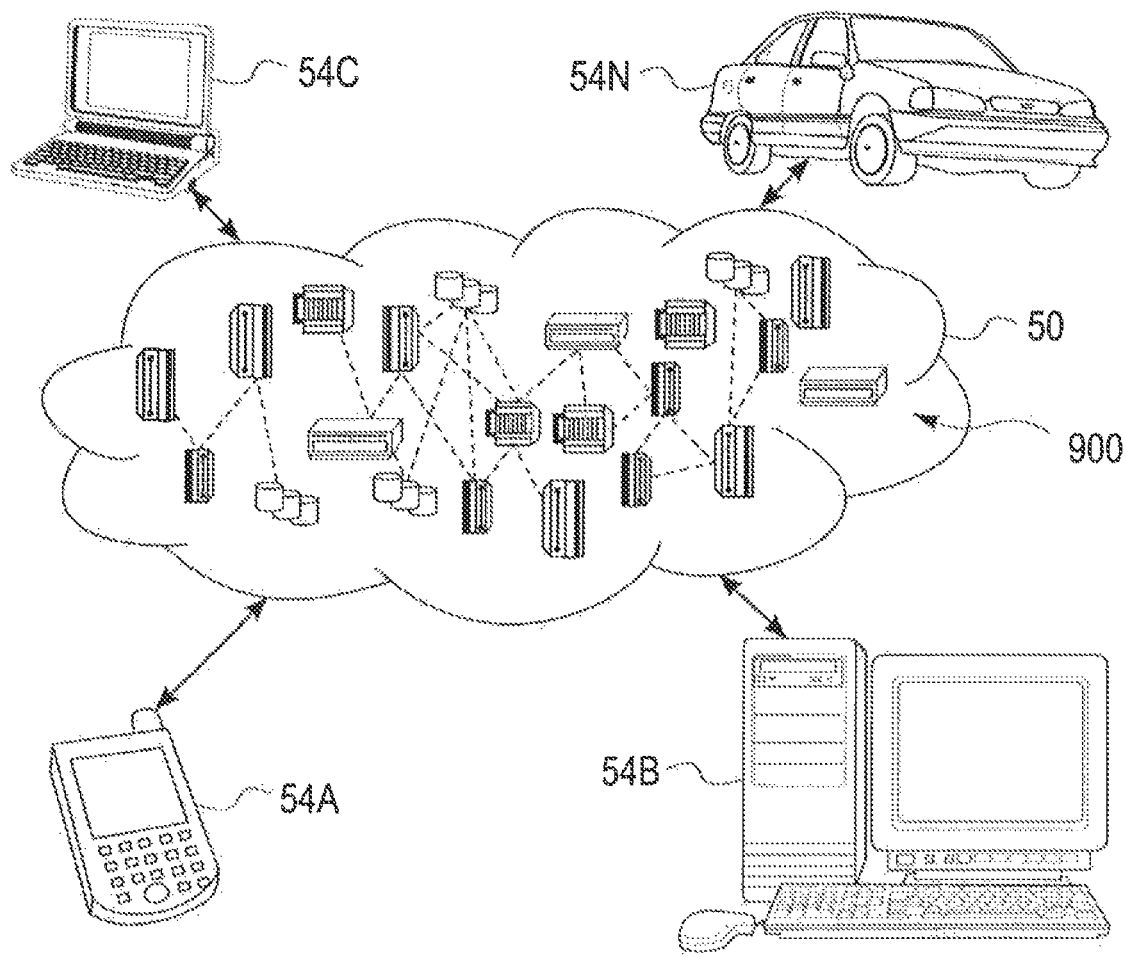
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 900 with which local computing devices used by cloud consumers, such as, for example, personal digital assistant (PDA) or cellular telephone 54A, desktop computer 54B, laptop computer 54C, and/or automobile computer system 54N may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for multicategory classification of streaming data records, comprising the steps of:
   receiving a list of signature rules, wherein a signature rule comprises a Boolean expression of a set of atomic recognizers (ARs) of one or more input fields of an input record and an assignment of a signature if the Boolean expression evaluates to TRUE, and an atomic recognizer is a logic function which takes an input record field value as input and determines which of different rule values for a <field, predicate-type> tuple corresponds to this input record field;
   generating a list of distinct signatures from the list of signature rules;
   generating a list of ARs from the list of signatures, and for each AR, a table of possible results for that AR;
   generating a list of all signature contexts from the list of signature rules, wherein the context of a signature rule is a subsequence of ARs ANDed together as conditions in the signature rule;
   generating a context lookup table for each context, wherein a dimensionality of each context table equals the number of AR's, a number of elements in each dimension is a number of possible output values of the corresponding AR, and for each context and for each rule resolved by that context, a context lookup table value corresponding to an AR output value is set to the signature result of that AR output value;
   determining a quit level for each context; and
   processing a stream of input records on which signature detection is performed by using said list of ARs, said list of signature contexts, and said context lookup table for each context, wherein each input record in the stream of input records is classified into one of a plurality of categories based on the signature detection result, wherein an amount of processing grows sublinearly with a number of signature rules being processed.

2. The method of claim 1, further comprising outputting a stream of output records that include the classification of each input record based on the signature detection result.

3. The method of claim 1, wherein each signature rule is in conjunctive normal form.

4. The method of claim 1, wherein the list of ARs is generated from the list of signature rides by listing, for each input record field, a list of different AR predicates that take values of said input record fields as input, wherein AR predicates include a regular expression match, a string match of a starting substring or an ending substring of an input record field with a specified character string or regular expression, a test of whether a string input record field value includes a keyword, a match of the input record field value to one of a set of matching strings, a test of whether an input record field value lies within a specific range of values, and a test of whether a most recent value of a state associated with input records having a particular key field value is either not initialized or has a value set by a previous signature operation.

5. The method of claim 1, further comprising:
   generating deterministic finite state automata (DFAs) from specifications of string AR's dealing with regular expression matching, keyword search, and beginning and ending substrings, wherein said DFAs are also used to detect signatures in the stream of input records;
   generating memory representations of those AR's that deal with value sets and value ranges for integer, floating point and address fields; and converting those AR's which do not require regular expression or keyword compilation into memory tables.

6. The method of claim 1, wherein determining a quit level for each context comprises determining, for each context in order, a number wherein all higher precedence signature rules in a signature precedence order have already been resolved in this or a higher precedence context.

7. The method of claim 1, wherein processing, a stream of input records on which signature detection is to be performed comprises:
reading an input record from an input data stream;
initializing state variables that track progress of signature detection processing in the input record, wherein that state variables include an AR result vector and a BEST_MATCH_SO_FAR variable, wherein the AR result vector has one entry for each AR defined for a current set of signature rules for storing a result of running that AR on an appropriate field of a current input record, and BEST_MATCH_SO_FAR is updated as signature matches are detected during processing of an input record to reflect that signature match with a rule of higher precedence has been found;
applying the ARs for each signature context of the list of signature rules to the input record and saving an AR result value to the AR result vector; and
determining from the context lookup table whether the AR result values in the AR result vector correspond to a signature match.

8. The method of claim 7, further comprising:
comparing, if a signature match has been found, a precedence of the signature match for this context with a precedence of a previous BEST_MATCH_SO_FAR, and updating BEST_MATCH_SO_FAR precedence of the signature match for this context has a higher precedence than the previous BEST_MATCH_SO_FAR; and
comparing the precedence of BEST_MATCH_SO_FAR with a precedence of the quit level, wherein if the precedence of BEST_MATCH_SO_FAR is higher than the precedence of the quit level, processing of the input record ceases.

9. The method of claim 1, wherein each field in the input record is identified by name and type.

10. The method of claim 7, wherein the list of signature rules include one or more stateful signature rules that comprise a Boolean expression of a set of ARs of one or more input fields of the input record and a specification of a state transition, if the Boolean expression evaluates to TRUE, wherein the method further comprises,
searching for a state-key value for the input record in a state store table using a state-key specification, wherein a state for the input record is set to the found state-key value if a state-key value is found, and the state for the input record is set to INIT if no state-key value is found;
saving a destination state value for a signature rule, if no signature has been matched for the input record; and
deleting the destination state value for the signature rule, if a signature match has been found.

11. A method for multicategory classification of streaming data records, comprising the steps of:
receiving a list of signature rules, wherein a signature rule comprises a Boolean expression of a set of atomic recognizers (ARs) of one or more input fields of an input record and an assignment of a signature if the Boolean expression evaluates to TRUE, and an atomic recognizer is a logic function which takes an input record field value as input and determines which of different rule values for a <field, predicate-type> tuple corresponds to this input record field;
reading an input record from an input data stream and identifying each field in the input record by name and type;
receiving a list of all signature contexts for the list of signature rules and a context lookup table for each context, wherein the context of a signature rule is a subsequence of ARs ANDed together as conditions in the signature rule, and a context lookup table value for an AR for each context and for each rule resolved by that context is a signature result of that AR output value;
initializing state variables that track progress of signature detection processing in the input record, wherein that state variables include an AR result vector and a BEST_MATCH_SO_FAR variable, wherein the AR result vector has one entry for each AR defined for a current set of signature rules for storing a result of running that AR on an appropriate field of a current input record, and BEST_MATCH_SO_FAR is updated as signature matches are detected during processing of an input record to reflect that a signature match with a rule of higher precedence has been found;
applying the ARs for each signature context of the list of signature rules to the input record and saving an AR result value to the AR result vector; and
determining from the context lookup table whether the AR result values in the AR result vector correspond to a signature match,
wherein the input record is classified into one of a plurality of categories based on the signature detection result, wherein an amount of processing is sublinear in a number of signature rules being processed.

12. The method of claim 11, further comprising:
comparing, if a signature match has been found, a precedence of the signature match for this context with a precedence of a previous BEST_MATCH_SO_FAR, and updating BEST_MATCH_SO_FAR precedence of the signature match for this context has a higher precedence than the previous BEST_MATCH_SO_FAR; and
comparing the precedence of BEST_MATCH_SO_FAR with a precedence of the quit level, wherein if the precedence of BEST_MATCH_SO_FAR is higher than the precedence of the quit level, processing of the input record ceases.

13. The method of claim 11, further comprising outputting a stream of output records that include the classification of each input record based on the signature detection result.

14. The method of claim 11, wherein each signature rule is in conjunctive normal form.

15. The method of claim 11, further comprising:
generating a list of distinct signatures from the list of signature rules;
generating a list of ARs from the list of signatures, and for each AR, a table of possible results for that AR;
generating the list of all signature contexts from the list of signature rules, wherein the context of a signature rule is a subsequence of ARs ANDed together as conditions in the signature rule;
generating the context lookup table for each context, wherein a dimensionality of each context table equals the number of AR's, a number of elements in each dimension is a number of possible output values of the corresponding AR; and
determining a quit level for each context.

16. The method of claim 15, wherein the list of ARs is generated from the list of signature rules by listing, for each input record, a list of different AR predicates, wherein AR predicates include a regular expression match, a string match of a starting substring or an ending substring of an input record with a specified character string or regular expression, a test of whether an input record field value matches a keyword, a match of the input record to one of a set of matching strings, a test of whether an input record field value lies within a specific range of values, and a test of whether a most recent value of an input record field is either not initialized or has a value set by a previous signature operation.

17. The method of claim 15, further comprising:
generating deterministic finite state automata (DFAs) from specifications of string AR's dealing with regular expression matching, keyword search, and beginning and ending substrings, wherein said DFAs are also used to detect signatures in the stream of input records;
generating memory representations of those AR's that deal with value sets and value ranges for integer, floating point and address fields; and
converting those AR's which do not require regular expression or keyword compilation into memory tables.

18. The method of claim 15, wherein determining a quit level for each context comprises determining, for each context in order, a number of preceding signature rules in a precedence order that have already been resolved in this or a higher precedence context.

19. The method of claim 11, wherein each field in the input record is identified by name and type.

20. The method of claim 11, wherein the list of signature rules include one or more stateful signature rules that comprise a Boolean expression of a set of ARs of one or more input fields of the input record and a specification of a state transition, if the Boolean expression evaluates to TRUE, wherein the method further comprises,
searching for a state-key value for the input record in a state store table using a state-key specification, wherein a state for the input record is set to the found state-key value if a state-key value is found, and the state for the input record is set to INIT if no state-key value is found;
saving a destination state value for a signature rule, if no signature has been matched for the input record; and
deleting the destination state value for the signature rule, if a signature match has been found.

21. A program storage device readable by a computer, tangibly embodying a program of instructions executed by the computer to implement a system for multicategory classification of streaming data records, said system comprising:
a signature detection compiler that converts a list of signature rules into a set of atomic recognizers (ARs), a set of contexts and a context look-up table, wherein a signature rule comprises a Boolean expression of a set of atomic recognizers of one or more input fields of an input record and an assignment of a signature if the Boolean expression evaluates to TRUE, an atomic recognizer (AR) is a logic function which takes an input record field value as input and determines which of different rule values for a <field, predicate-type> tuple corresponds to this input record field, a context of a signature rule is a subsequence of ARs ANDed together as conditions in the signature rule, and a context lookup table determines for each set of possible AR values for the AR's appearing in that context whether the given input record matches any rule with that context,
a sublinear signature detection runtime processor that processes a stream of input records on which signature detection is to be performed using the set of ARs, the set of contexts and the context look-up table and outputs an annotated or updated stream of output records that include signature classification information, wherein processing for each input record is an iteration through contexts with one or more table lookup operations for each context.

22. The computer readable storage device of claim 21, further comprising a string pattern converter that converts AR specifications for string oriented ARs involving Regular Expression pattern matching, key word searches and associated character by character string predicates into deterministic finite state automata (DFA) tables which can be used at run-time by the sublinear signature detection runtime processor.

23. The computer readable storage device of claim 22, wherein the set of atomic recognizers (ARs), the set of contexts, the context look-up table and the DFA tables are regenerated when the list of signature detection rules is dynamically refreshed.

24. The computer readable storage device of claim 21, wherein the system further comprises a graphical user interface for constructing the list of signature rules and passing said list of signature rules to the signature detection compiler.

25. The computer readable storage device of claim 21, wherein the context look-up table entries include a NOT_FOUND value for combinations of AR values which do not appear in any rule of the list of signature rules.

26. The computer readable storage device of claim 21, wherein the list of signature rules include one or more stateful signature rules that comprise a Boolean expression of a set of ARs of one or more input fields of the input record and a specification of a state transition, if the Boolean expression evaluates to TRUE, wherein the processing of the input records includes
searching for a state-key value for the input record in a state store table using a state-key specification, wherein a state for the input record is set to the found state-key value if a state-key value is found, and the state for the input record is set to INIT if no state-key value is found;
saving a destination state value for a signature rule, if a non final state transition signature has been matched for the input record; and
deleting the destination state value for the signature rule, if a final state transition signature match has been found which results in a signature detection and an end of a state tracking sequence.

* * * * *